United States Patent [19]

Iwamura et al.

[11] Patent Number: 5,045,950

[45] Date of Patent: Sep. 3, 1991

[54] CIRCUIT FOR DETECTING AND COMPENSATING FOR JITTER PRODUCED BY A RECORDING/REPRODUCING APPARATUS

[75] Inventors: Soichi Iwamura, Fuchi; Satoshi Murakami, Nagareyama; Masakazu Ishikawa, Abiko; Naoki Koide, Yachiyo, all of Japan

[73] Assignee: Sharp Kabushiki Kaisha, Osaka, Japan

[21] Appl. No.: 187,441

[22] Filed: Apr. 28, 1988

[30] Foreign Application Priority Data

May 1, 1987 [JP] Japan ................................ 62-108532
Apr. 15, 1988 [JP] Japan .................................. 63-93180

[51] Int. Cl.$^5$ ............................................. H04N 9/89
[52] U.S. Cl. ..................................... 358/319; 358/323; 358/327
[58] Field of Search ............... 358/310, 319, 320, 323, 358/324, 326, 327, 337; 360/23, 33.1, 36.1, 37.1

[56] References Cited

U.S. PATENT DOCUMENTS

| | | | |
|---|---|---|---|
| 4,005,473 | 1/1977 | Hjortzberg | 358/320 |
| 4,034,397 | 7/1977 | Trost | 358/323 |
| 4,393,418 | 7/1983 | Kimura | 360/36.1 X |
| 4,422,103 | 12/1983 | Kanamaru | 360/36.1 X |
| 4,616,270 | 10/1986 | Nishimoto | 358/320 |
| 4,704,639 | 11/1987 | Yamanishi et al. | 358/320 X |
| 4,916,548 | 4/1990 | Morioka et al. | 360/23 X |

*Primary Examiner*—Roy N. Envall, Jr.
*Assistant Examiner*—W. R. Young

[57] ABSTRACT

An improved jitter detecting method and an apparatus thereof, for detecting jitter generated in a reproduced video signal of a VTR or video disc wherein a frequency-modulated carrier of a video signal is recorded by synchronizing the leading edge of a sync signal with the phase of the forefront carrier of a constant frequency carrier train corresponding to a sync tip for every horizontal period at the time of frequency-modulation. From the reproduced frequency-modulated carrier, the phase-reset constant frequency carrier train is utilized as a reference burst signal, thereby to be capable of removing a time-base error by detecting a specific zero-crossing timing of the carrier burst through a bandpass filter based on the trailing edge of a frequency-modulated sync signal during reproduction.

14 Claims, 16 Drawing Sheets line sequence TCI signal format

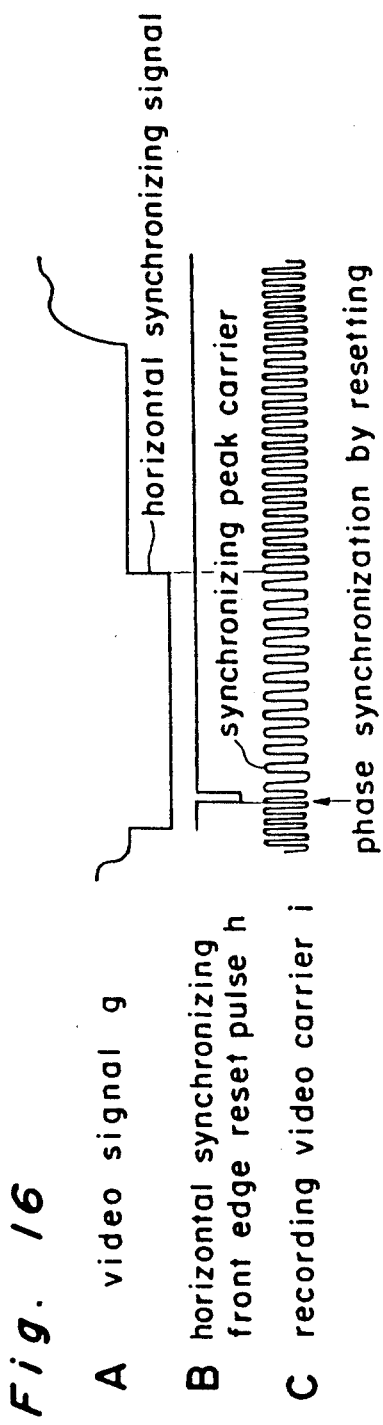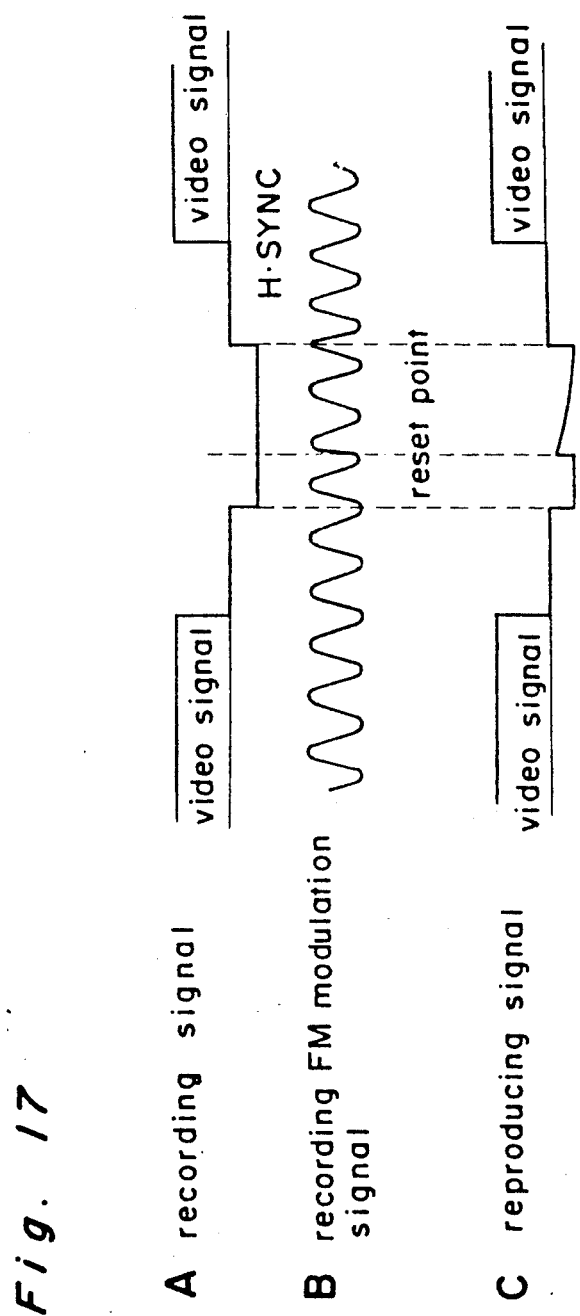

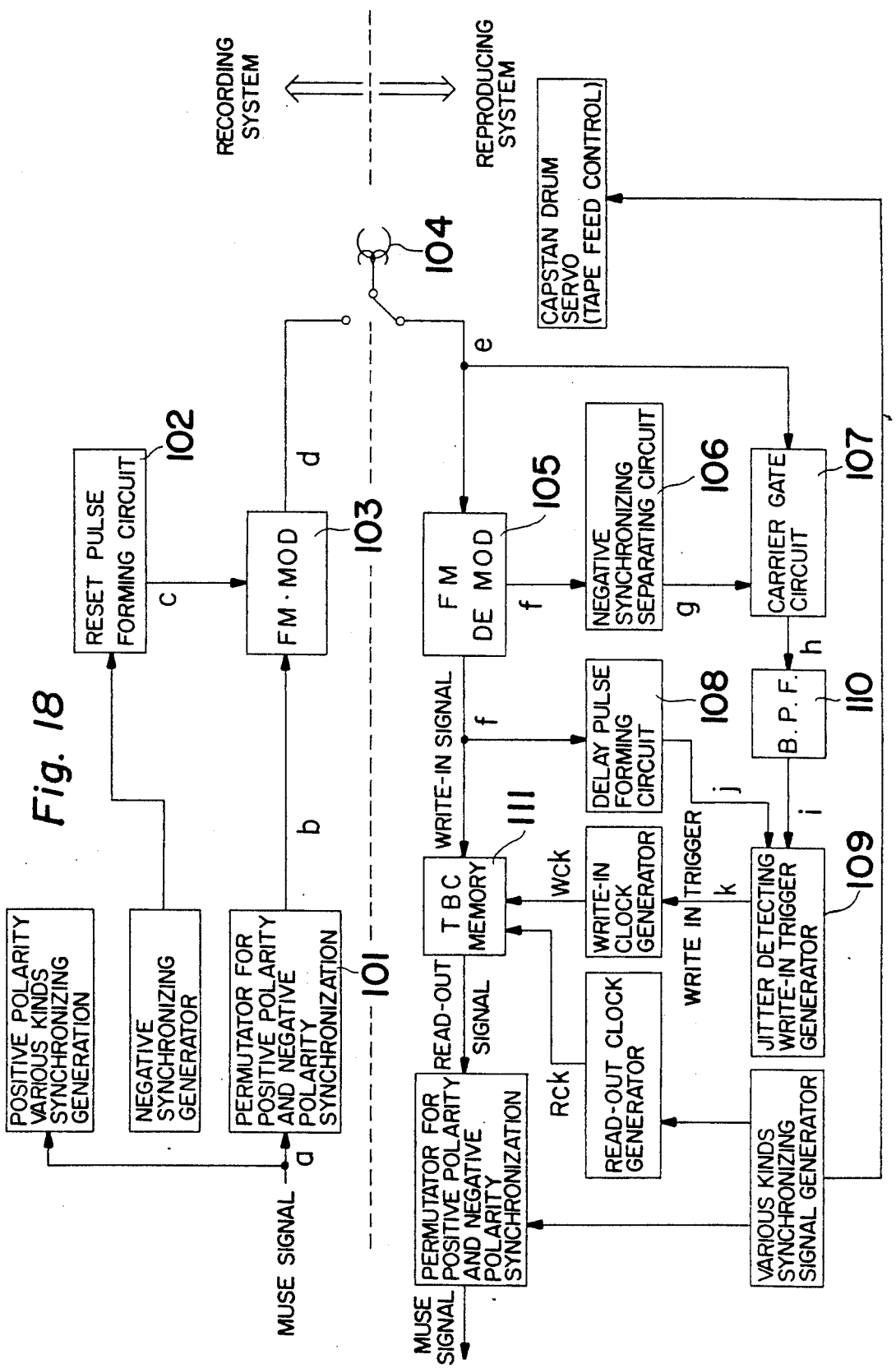

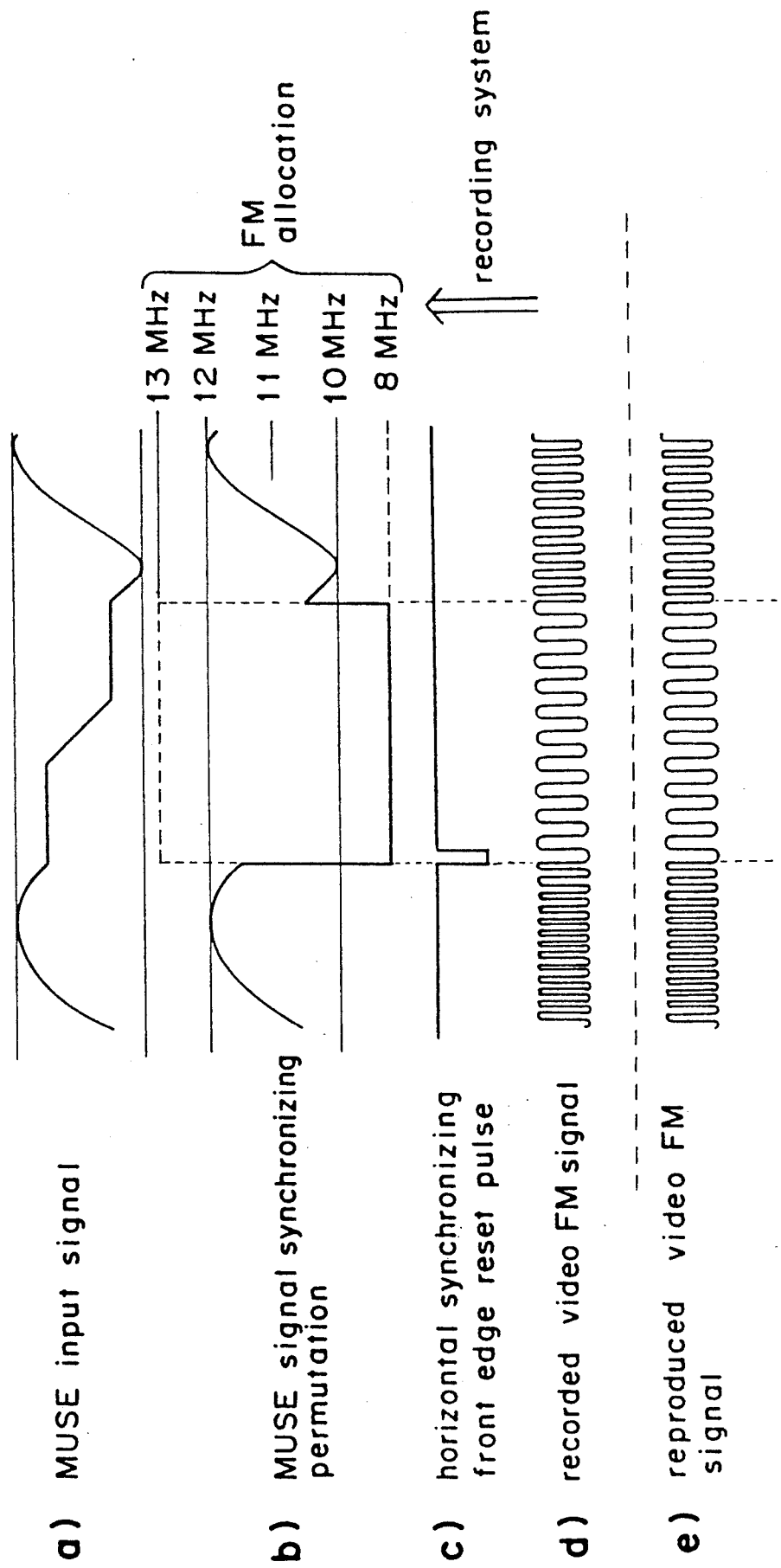

(a) MUSE signal horizontal line assignment (b) horizontal synchronizing wave
(timing phase having been passed signal middle level)

CIRCUIT FOR DETECTING AND COMPENSATING FOR JITTER PRODUCED BY A RECORDING/REPRODUCING APPARATUS

BACKGROUND OF THE INVENTION

1. Field of the Invention

The present invention relates to a jitter detecting apparatus for detecting and compensating for jitter in a VTR recording/reproducing video signal applied to a recording/reproducing apparatus which records and reproduces a video signal by multiplying a luminance signal and a chrominance signal on time bases.

2. Description of Related Art

In a video signal reproduced by a recording/reproduction apparatus, a time base inevitably fluctuates and jitter is often generated. Jitter includes a phase jitter and a frequency jitter (velocity error). In principle, the frequency jitter causes the expansion and compression of a horizontal period to occur.

Normally, the fluctuation amount of the frequency jitter is very slight even on a reproduced picture from a home video system having a relatively simple mechanism. Therefore, the correction of the phase jitter of a reproduced video signal is enough to ensure the stabilization of a reproduced image.

The correction of the phase jitter generated in a video signal can be useful in the following processes without resulting in problems: The decrease of random noise using a frame correlation, the synthesizing of two-channel video signals, specific processings such as a fade-in or a fade-out, and a digital processing operation for performing double speed scanning in high density television (for example, HDTV).

FIG. 11 shows an example of a jitter detecting circuit 20, for correcting a phase jitter, for use in such a recording/reproducing apparatus (hereinafter referred to as VTR.)

The jitter detecting circuit 20 shown in FIG. 11 is used for a broadcasting VTR in which composite video signals generated by an NTSC system, PAL system, or the like are recorded by a direct frequency modulation recording system.

A reproduced video signal (a) (shown by (A) in FIG. 12) of, for example, the NTSC system which is supplied to a terminal 1 is inputted to a synchronizing pulse separating circuit 2 in which a horizontal synchronizing signal (b) (shown by (B) in FIG. 12) is extracted and separated from the video signal (a). A burst gate pulse (not shown) generated from the horizontal synchronizing signal (b) is supplied to a burst gate circuit 3 in which a burst signal (c) (shown by (C) in FIG. 12) is separated from the input video signal.

The burst signal (c) is supplied to a narrow bandpass filter 4 in which a burst signal (d) (shown by (D) in FIG. 12) high in C/N ratio is produced.

The horizontal synchronizing signal (b) is supplied to a delay pulse generating circuit 5 in which a delay pulse (e) (shown by (E) in FIG. 12) is generated. The delay pulse (e) and the burst signal (d) which has passed through the narrow bandpass filter 4 are supplied to a jitter pulse generating circuit 6, thus a jitter detecting pulse (f) (shown by (F) in FIG. 12) being generated. The phase of the leading edge of the jitter detecting pulse (f) lags by a predetermined period of time behind the phase of the horizontal synchronizing signal (b).

The phase of the trailing edge of the jitter detecting pulse (f) is obtained by detecting a specific zero crossing point of the burst signal (d). The write timing of a time base correcting circuit (TBC) is determined on the basis of the timing of the trailing edge of the jitter detecting pulse (f).

The fluctuation of the time base in the reproduced video signal (a) causes the time base of the specific zero crossing point of the burst signal (d) to fluctuate. Thus, a video signal can be written in the time base correcting circuit (TBC) in synchronization with a generated jitter.

A burst signal is not produced if a TCI (Time Compressed Integration) system is adopted as a video signal recording system whereas the burst signal is generated in the direct frequency modulation recording.

FIG. 13 shows the signal format of MTCI (Modified Time Compressed Integration) system, of the TCI system, in which a band-compressed chrominance signal is recorded in a line sequential system.

Compressed component chrominance signals, for example, color-difference signals R-Y of red and B-Y of blue are inserted and multiplied in a horizontal blanking period as shown by (A) and (B) in FIG. 13.

Reference symbol (Y) denotes a luminance signal. The color-difference signals R-Y of red and B-Y of blue are inserted into the line sequential system.

Normally, a jitter detecting signal is obtained by detecting the rising or falling portion of a horizontal synchronizing signal in a video signal reproduced by such a signal format.

As described above, a jitter detecting signal is detected according to the detection of the rising or falling portion of the horizontal signal in the TCI recording system. This system has a disadvantage in that jitter detection cannot be performed with high accuracy.

The generation of a jitter detecting signal based on the falling portion of the horizontal synchronizing signal is described with reference to FIG. 14.

Normally, noise (N) whose phase and level are random is superposed on a horizontal synchronizing signal. Therefore, if a detecting level is set to (A), the detection timing fluctuates by $\Delta T$ caused by the phase of the superposed noise (N). The fluctuation amount $\Delta T$ (fluctuation amount of the time base, namely, amount of synchronizing jitter) affects the accuracy in performing a jitter detection.

The fluctuation amount $\Delta T$ of a horizontal synchronizing signal is approximated at an intermediate level assuming that its signal band is 4 MHz and the S/N is 40 dB.

As shown in FIG. 15, assuming that the amplitude of a horizontal synchronizing signal is 1 Vp-p, the effective value of the noise (N) superposed on the horizontal synchronizing signal (b), whose amplitude is 0.3V, is approximately 10 mV. Supposing that the falling portion of the waveform of the horizontal synchronizing signal can be approximated by $\frac{1}{2}$ cycle of a sine wave of 4 MHz, the inclination (K) of the level at the center of the sine wave is expressed as follows:

$$K = 125 \text{ ns}/ (0.3 (\pi/2)V) = 265 \text{ ns/V}$$

Assuming that the peak-to-peak value of the superposed noise (N) is six times as great as that of the effective value, the peak-to-peak value of the fluctuation amount $\Delta T$ is expressed as follows:

$$\Delta Tp\text{-}p = 265 \times 0.01 \times 6 = 16 \text{ ns}$$

That is, jitter caused by the noise (N), accurately detected cannot be below 16 nsec.

In addition, as shown in FIG. 14, a detecting level may fluctuate from (A) to (B). The fluctuation of the detecting level causes the jitter detecting accuracy to fluctuate to a great extent. In order to limit the fluctuation amount $_\Delta T'$ to below 20 nsec, it is necessary that the fluctuation amount of a detecting level does not exceed 50 mV, which results in a great increase of the cost of a detecting level generating circuit. In this respect, such a method for generating a jitter detecting signal is not preferable.

The fluctuation of a detecting level occurs also due to the fluctuation of a clamp level and the amplitude fluctuation of a video signal.

The above approximated value of the fluctuation amount is obtained from a VTR having an accurately constructed circuit. However, the fluctuation amount $\Delta T$ may be as great as 100 nsec in home VTR systems.

Thus, the generation of a jitter detecting signal in accordance with the rising or falling portion of a horizontal synchronizing signal gives rise to the problem that jitter cannot be detected with high accuracy.

As a means for solving this problem, the following method is considered: The phase of a frequency modulation carrier is controlled so that it becomes 0° or 180° for every horizontal period. However, the following problem arises if this method is carried out.

That is, normally, as shown by (B) in FIG. 17, the phase of the frequency modulation carrier is discontinuous before and after a point at which the phase of the frequency modulation carrier is reset.

When a signal recorded with the phase of the frequency modulation carrier being discontinuous is reproduced, as shown by (C) in FIG. 17, a level change (defect) occurs in the reproduced video signal in the shape of a sawtooth at the point corresponding to the discontinuity of the frequency modulation carrier phase.

Thus, such a fluctuation of the frequency-demodulated output causes a large amount of demodulation error at this point.

The clamp system of a reproduced video signal employed in a home VTR system is a sync chip clamp system. Therefore, a defect of the sync chip may cause a clamp error, which causes a defective detection of a synchronizing signal and a change of the luminance level of the reproduced output signal.

SUMMARY OF THE INVENTION

The present invention substantially solves the above-described disadvantages and has for its object to provide an improved jitter detecting method for detecting jitter generated in a reproduced video signal of a VTR.

It is another object of the present invention to provide a jitter detecting apparatus, for detecting jitter generated in a reproduced video signal of the VTR, capable of removing a demodulation error caused by the reset of a frequency modulation (hereinafter referred to as FM) carrier.

The method for detecting jitter generated in a video signal recorded and reproduced by multiplying a luminance signal and a chrominance signal on the time bases thereof comprises the steps of recording a video signal by synchronizing the phase of the leading edge of a horizontal synchronizing signal with the phase of a frequency modulation carrier corresponding to a synchronizing peak-to-peak value for every horizontal period at the time of a frequency modulation; and detecting a jitter generated in a reproduced video signal by detecting a specific zero crossing point of a narrow-band FM carrier based on the trailing edge of a frequency-demodulated horizontal synchronizing signal at the time of reproduction.

A jitter detecting apparatus in accordance with the present invention detects a jitter generated in a video signal recorded and reproduced by performing time division multiplexing or frequency division multiplexing of a luminance signal and a chrominance signal wherein: a frequency modulation recording is performed by synchronizing the phase of the leading edge of a horizontal synchronizing signal or a phase in the vicinity thereof with the phase of a frequency modulation carrier for every horizontal period. A phase-continuous compensating signal for suppressing the fluctuation of the frequency modulation carrier is inserted into the front porch of the horizontal synchronizing signal when the phase thereof is synchronized with the phase of the horizontal synchronizing signal at the time of frequency modulation. The jitter of the reproduced video signal is detected by detecting a specific zero crossing point of a narrow-band frequency modulation carrier based on the trailing edge of a frequency-demodulated horizontal signal at the time of a reproduction.

A first advantageous feature of the present invention is that the FM carrier is used as a signal which corresponds to a burst signal.

Thus, the FM of a video signal is recorded by synchronizing the phase of the leading edge of a horizontal synchronizing signal or the phase of the horizontal synchronizing signal in the vicinity thereof with the phase of an FM carrier for every horizontal period. That is, the FM carrier is reset at the leading edge of the horizontal synchronizing signal or in the vicinity thereof for every horizontal period.

A second advantageous feature of the present invention is that at the time of reproduction, a delay pulse for detecting a zero crossing point is generated with respect to the trailing edge of the horizontal synchronizing signal.

The trailing edge of a demodulated horizontal synchronizing signal is hardly affected by the fluctuation of the phase of the FM carrier. Thus, the period of a synchronizing jitter is reduced to much less than ½ period (150 nsec. for 3.4 MHz FM carrier). Consequently, the specific zero crossing point of the FM carrier can be accurately detected by a gate circuit in which a delay pulse is generated.

A third advantageous feature of the present invention is that jitter is detected using an FM carrier which has passed a narrow-band filter (BPF).

The C/N of the FM carrier which has passed through the narrow-band filter becomes high. Therefore, the fluctuation amount of a time base is reduced to a great extent. Further, no offset errors occur because no direct current components are removed, so that generated jitter can be detected with high accuracy.

A fourth advantageous feature of the present invention is that a phase continuous compensating signal is inserted into the front porch of a horizontal synchronizing signal.

The phase continuous compensating signal prevents the phase of an FM carrier from being discontinuous when the FM carrier is reset. The value (level) of the phase continuous compensating signal is controlled depending on video signals.

A demodulation error does not occur in a horizontal synchronizing signal because the carrier phase is continuous at the time of a reset.

In addition to the above-described jitter detecting apparatus and the method therefor, the jitter detecting method of the present invention further comprises the steps of recording a video signal by synchronizing the phase of the leading edge of a horizontal synchronizing signal with the phase of an FM carrier corresponding to a synchronizing peak-to-peak value for every period after substituting part or all of the horizontal blanking period, including a positive polarity synchronization of the video signal, by a negative polarity horizontal synchronizing signal, and at the time of a reproduction, gating the FM carrier corresponding to a sync chip as a reference burst by a frequency-demodulated horizontal synchronizing signal; passing the FM carrier through a noise removing bandpass filter; and detecting with high accuracy the time base error of a reproduced video signal by extracting a specific zero crossing point corresponding to the trailing edge of the horizontal synchronizing signal therefrom.

In order to perform the above-described jitter detecting method, the time base error detecting/correcting method comprises the steps of substituting part or all of the blanking period of a video signal including a horizontal synchronizing signal such as a MUSE signal buried (positive polarity) within the video signal by projecting a (negative polarity) horizontal synchronizing signal, such as a standard television signal, before the video signal is recorded in a VTR so as to detect and correct a time base error; resetting the FM carrier phase corresponding to the leading edge of the substituted horizontal synchronizing signal, namely, the phase of the peak-to-peak value of the carrier corresponding to a sync chip to a constant value when a frequency modulation is performed to record the video signal in a recording medium, and at the time of reproduction; gating the FM carrier corresponding to the sync chip of a reproduced FM carrier by the frequency-demodulated horizontal synchronizing signal; and detecting a time error signal using the burst carrier present in the portion corresponding to the sync chip of the reproduced FM carrier as a reference burst at the time of a reproduction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIGS. 16, A-C and 17 A-C are explanatory drawings for describing operations of an FM carrier reset system;

FIG. 18 is a block diagram of a video tape recorder which performs a time base error detection/correction in accordance with the present invention;

FIGS. 19(a) and 19(b) are timing charts illustrating the waveforms of the respective portions shown in FIG. 18;

DESCRIPTION OF THE PREFERRED EMBODIMENT

FIRST EMBODIMENT

The description of a jitter detecting apparatus for detecting jitter generated in a video signal in accordance with the present invention is made with reference to a VTR which records and reproduces a video signal in accordance with TCI (Time Compressed Integration) with reference to FIG. 1 through FIG. 17.

Figure 3:
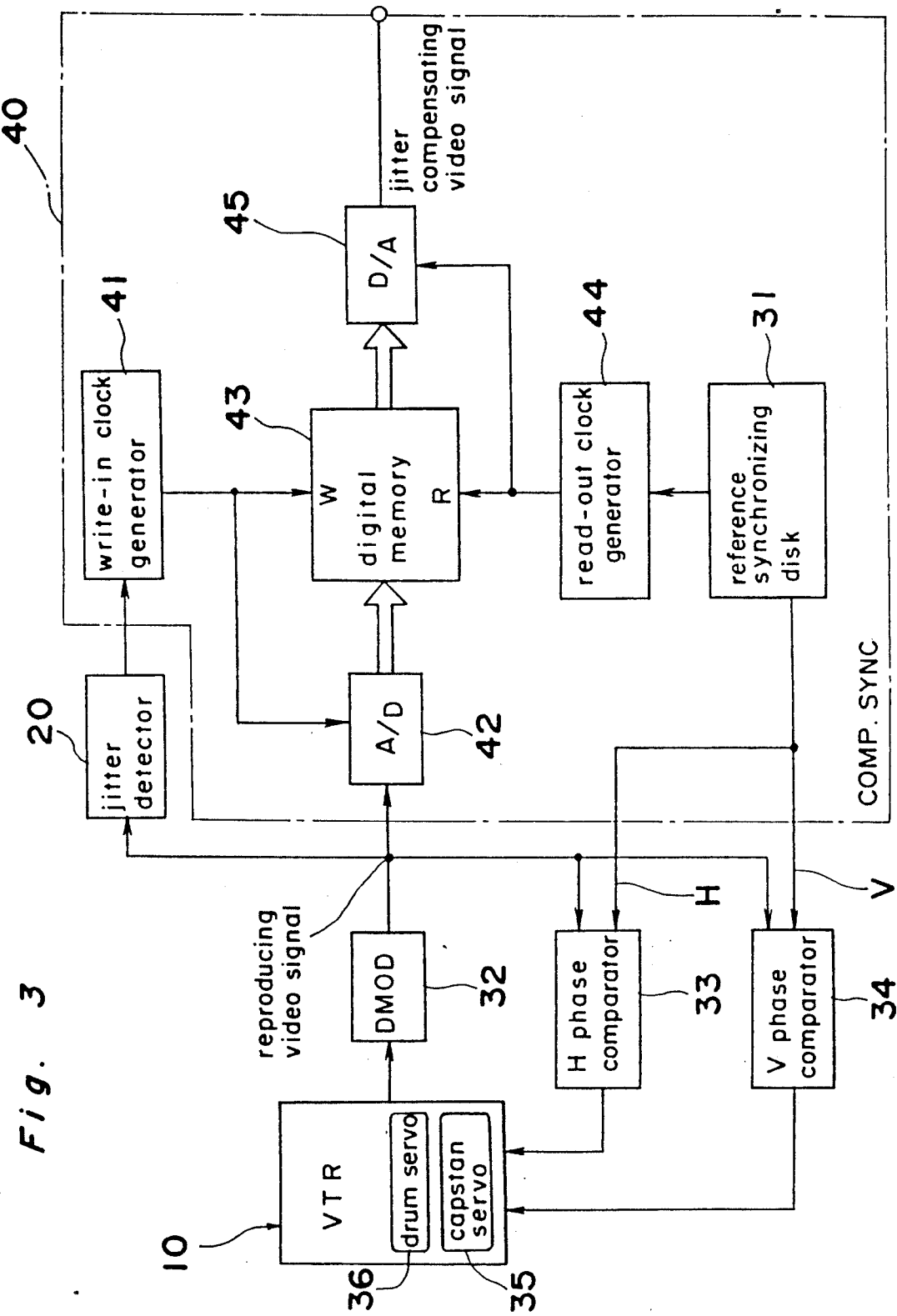
Fig. 3 is a schematic flow diagram illustrating an example of a time base correcting device.

A time base correcting device including a jitter detecting system is described referring to FIG. 3.

A horizontal synchronizing signal of composite synchronizing signals outputted from a reference synchronizing disk 31 is compared with a horizontal synchronizing signal reproduced in a horizontal phase comparing circuit 33. A vertical synchronizing signal outputted from the reference synchronizing disk 31 is compared with a vertical synchronizing signal reproduced in a vertical phase comparing circuit 34.

Error signals obtained in the horizontal phase comparing circuit 33 and the vertical phase comparing circuit 34 are supplied to a capstan servo system 35 and a drum servo 36, provided in a recording/reproducing circuit 10, in which capstan servo and drum servo controls are affected.

The frequency of a reproduced video signal is demodulated in a demodulator 32. The frequency-demodulated output is supplied both to an A/D converter 42 of time base correcting circuit (TBC) 40 and to a jitter detecting circuit 20 in which jitter generated in the video signal is detected. A jitter detecting signal is utilized as a trigger signal of a write clock generating circuit 41, and the phase of a write clock is reset in synchronization with the falling edge of the jitter detecting signal.

The write clock is used as a sampling signal in the A/D converter 42 and also as a write address signal in a digital memory 43. Accordingly, the reproduced video signal is written in the digital memory 43 with jitter included therein.

A reference clock outputted from the reference synchronizing disk 31 is supplied to a readout clock generating circuit 44 in which a readout address signal is generated and the video signal is read out in synchronization with the clock of the readout address signal. The readout video signal is converted into an analog signal in a D/A converter 45 to which the clock of the readout address signal has been supplied.

Since the readout clock is generated of a constant period, a video signal which does not fluctuate with respect to the time base is reproduced. That is, a jitter-corrected video signal is reproduced.

According to a jitter detecting apparatus of the present invention, a video signal is recorded and reproduced by multiplying a luminance signal and a chrominance signal on the time bases thereof, and by synchronizing the phase of the leading edge of a horizontal synchronizing signal, or phases of the horizontal synchronizing signal, in the vicinity of the phase of the leading edge thereof with the phase of an FM carrier corresponding to a synchronizing peak-to-peak value for every horizontal period. Thus, the FM carrier is reset at the leading edge of the horizontal synchronizing signal, or in the vicinity of the leading edge thereof, for every horizontal line.

The discontinuity of the phase generated before and after a point when an FM carrier is forcibly reset is removed by a phase continuous compensating signal inserted into the front porch of the horizontal synchronizing signal.

At reproduction time, jitter of a reproduced video signal is detected by detecting a specific zero crossing point in a narrow-band FM carrier based on the trailing edge of the frequency-demodulated horizontal synchronizing signal.

The phase applied to the write clock of the digital memory 43 is reset by the jitter detecting signal. Accordingly, the reproduced video signal is sampled and written into the digital memory 43 by the writing clock which fluctuates in synchronization with the reproduced video signal. Thereafter, using the readout clock which is constant with respect to the time base, video signals are sequentially read out in pixels, whereby a jitter-corrected video signal can be obtained.

Figure 1A:
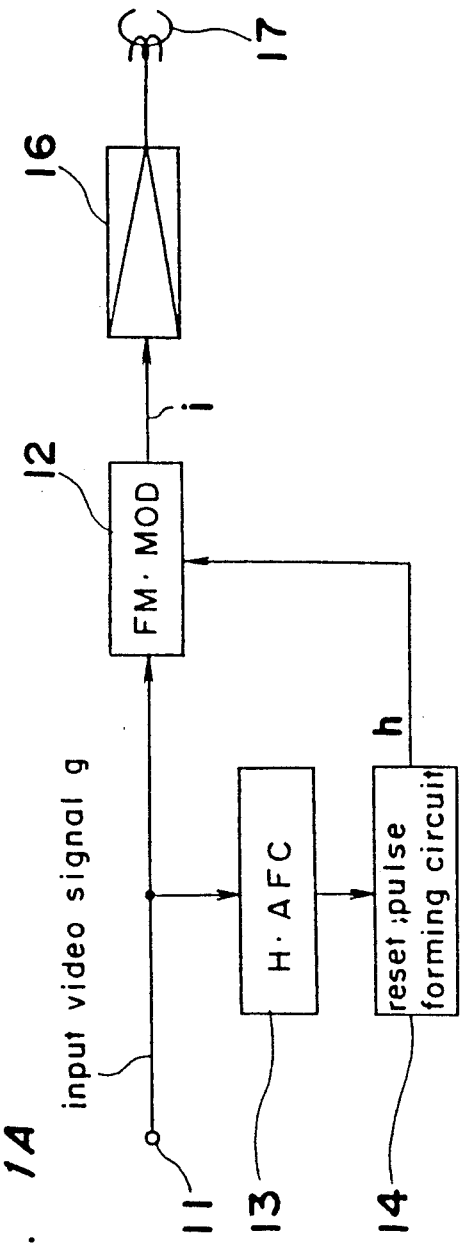
FIG. 1A and 1B are schematic flow diagrams of jitter detecting circuits and the method therefor for detecting jitter of a video signal in accordance with the present invention.
Figure 1B:
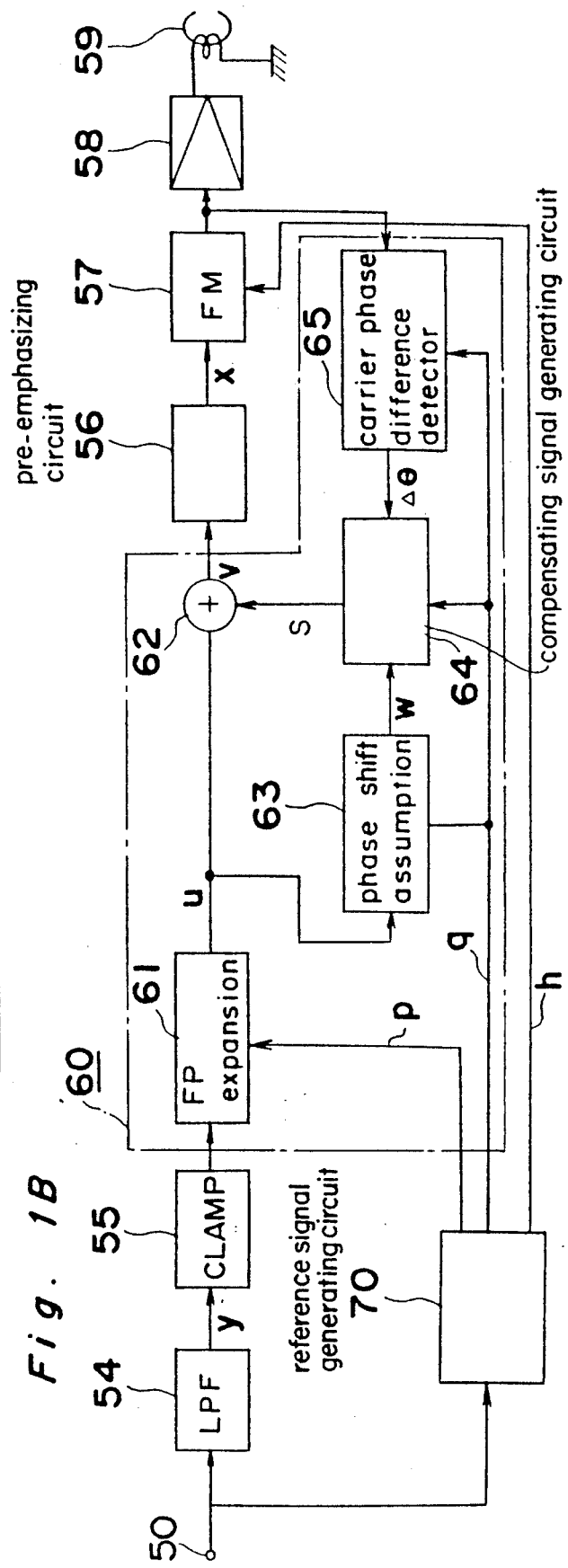

Fig. 1A and Fig. 1B illustrate examples of such a jitter detecting device for detecting jitter generated in a video signal. In the signal recording system of this jitter detecting apparatus, signal processing serving as the criterion for detecting jitter is performed.

Fig. 1A illustrates shows an example of a recording circuit of the above-described recording/reproducing circuit 10.

A video signal to be inputted to a terminal 11 includes no jitter. The shape of the signal is an MTCI signal formed by compressing line-sequential chrominance components on the time base which are multiplied by a luminance signal.

The frequency of the inputted video signal shown as (A) in FIG. 16 is modulated by an FM modulator 12. In consideration of the possible degradation of the S/N of the inputted video signal, the horizontal synchronizing frequency is stabilized by an automatic frequency control (AFC) circuit 13 in this recording/reproducing circuit 10, whereby the value of the jitter which has been generated at the leading edge of the horizontal synchronizing signal does not exceed a predetermined value (5 nsec in this example).

A horizontal synchronizing signal outputted from the AFC circuit 13 is supplied to a reset pulse generating circuit 14 in which a reset pulse ((h) shown by (B) in Fig. 16) synchronized with the leading edge of the horizontal synchronizing signal is produced.

The FM carrier is reset by the reset pulse (h). That is, the FM carrier frequency corresponding to the synchronizing peak-to-peak value corresponding to the leading edge of the horizontal synchronizing signal is reset. Thus, the rise portion of the horizontal synchronizing signal is synchronized with the phase of the FM carrier.

Normally, in a magnetic recording, a low carrier wave FM system is adopted and a carrier wave generating portion is integrally formed with the FM modulation portion, so that these portions cannot be distinguished from each other. Thus, the information of the phase of the FM carrier modulated by a video signal (g) is lost within the effective scanning period of an image because the frequency of the video signal is modulated. Therefore, it is necessary to add the phase information to every horizontal period. To this end, the FM carrier is reset by the reset pulse (h) for every horizontal period.

The FM carrier frequency corresponding to the synchronizing peak-to-peak value varies with the recording systems of VTRs. For example, in a VTR employing a very high frequency (VHS) system, the frequency of the FM carrier frequency corresponding to the synchronizing peak-to-peak value is 3.4 MHz (5.4 MHz in a high resolution system).

Figure 12:
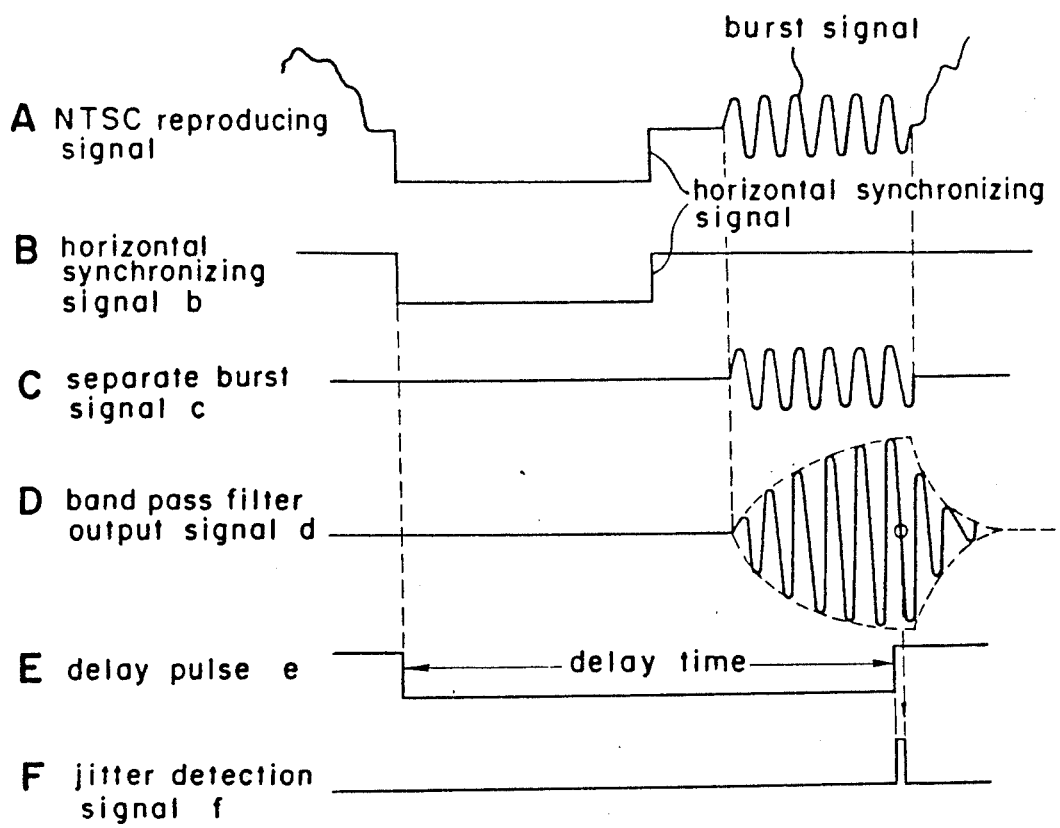
FIG. 12, consisting of A-F, is an explanatory drawing for describing the operation of the jitter detecting circuit shown in Fig. 11.
Figure 13:
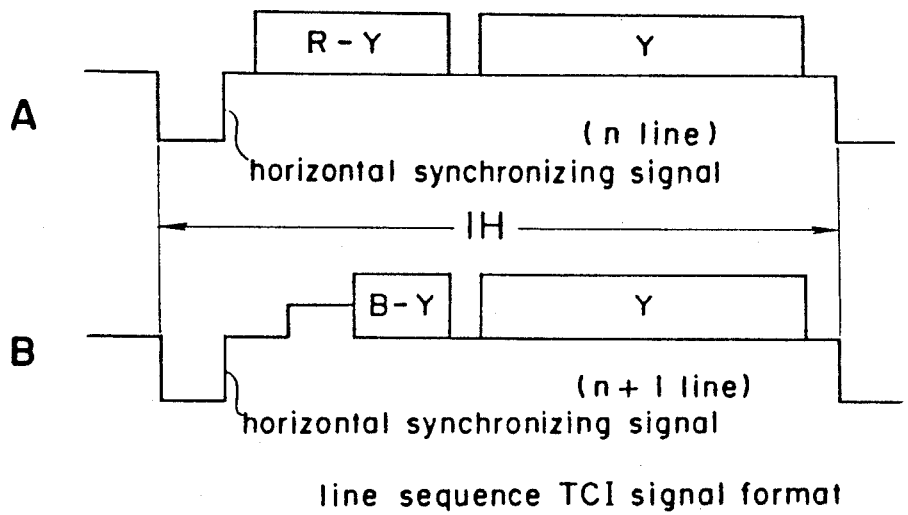
FIG. 13, A and B, is an explanatory drawing for describing the format of a video signal using MTCI system.
Figure 14:
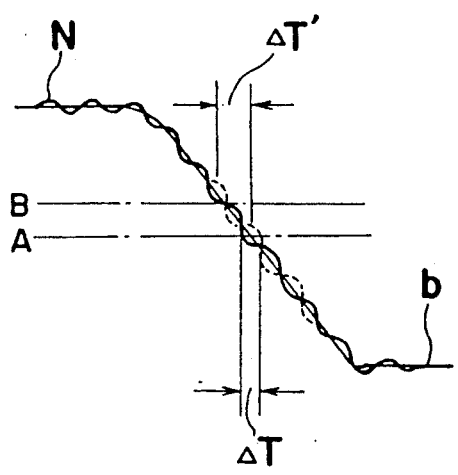
FIGS. 14 and 15 are explanatory drawings for explaining synchronizing jitters.
Figure 15:
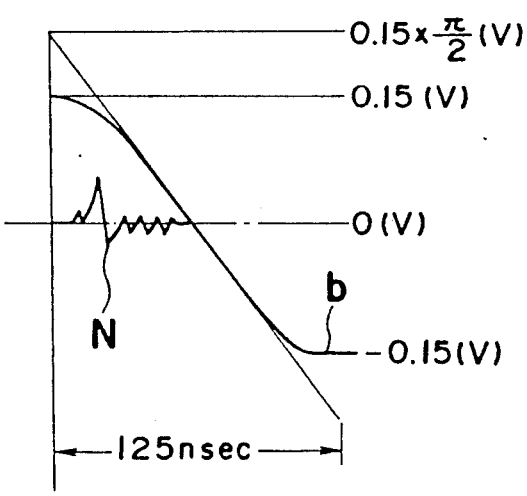

As shown by (D) in FIG. 12, when the detection of a zero crossing.. point is performed in an operation for detecting a phase jitter, the FM carrier may be reset at an angle of 0° or 180°.

As a result, an FM signal (i) shown by (C) in Fig. 16 is obtained from the FM modulator 12. The FM signal (i) is supplied to and recorded by a rotary magnetic head 17 through a recording amplifier 16.

Fig. 1B shows another example of the recording circuit of the above-described recording/reproducing circuit 10 which constitutes part of the jitter detecting apparatus.

A video signal which includes no jitter is inputted to an input terminal 50.

The shape of the video signal inputted to the input terminal 50 is an MTCI signal generated by compressing line-sequential chrominance components on the time base which are multiplied by a luminance signal.

Considering that the S/N of the frequency of the inputted video signal degrades, a video signal whose horizontal synchronizing frequency has been stabilized is supplied to the input terminal 50, whereby the value of jitter generated at the leading edge of a horizontal synchronizing signal is kept below a predetermined value (5 nsec. in this example).

The inputted video signal is supplied to a low-pass filter 54 in which a noise component outside the transmission band is removed. Thereafter, the inputted video signal is clamped to have a predetermined level (pedestal level in this example) by a clamp circuit 55.

A phase continuous compensating signal (s) to be described later is inserted into and added to the clamped video signal in a phase continuous compensating circuit 60 which is the principal portion of the jitter detecting apparatus of the present invention. Thereafter, high-band emphasis is realized in a pre-emphasizing circuit 56.

The video signal whose frequency characteristic has been corrected is inputted to an FM modulator 57 for modulating its frequency. The frequency-modulated video signal is supplied to a magnetic head 59 through an amplifier 58 in which the frequency-modulated video signal is recorded. As a result, an FM signal (i) shown by (C) in FIG. 16 is obtained from the FM modulator 57.

The FM carrier frequency varies with the recording systems of VTRs. For example, in a VTR employing a VHS system, the frequency of the FM carrier corresponding to the synchronizing peak-to-peak value is 3.4 MHz (5.4 MHz in a high resolution system (S-VHS system)).

The video signal inputted to the input terminal 50 is also supplied to a reference signal generating circuit 70 from which three reference signals (h), (p), and (q) are outputted.

The third reference signal (h) of these three reference signals is used as the reset pulse (refer to Fig. 16, (B)) of the FM carrier, whereby the falling edge portion of the horizontal synchronizing signal is synchronized with the phase of the FM carrier.

The FM carrier frequency corresponding to the synchronizing peak-to-peak value corresponding to the leading edge of the horizontal synchronizing signal is reset by the reset pulse (h).

The reset pulse (h) can be produced in synchronization with the leading edge of the horizontal synchronizing signal. The reset pulse (h) can also be produced within a predetermined period of time later than the leading edge. The description on the reset pulse (h) is made referring to the latter.

Figure 4:
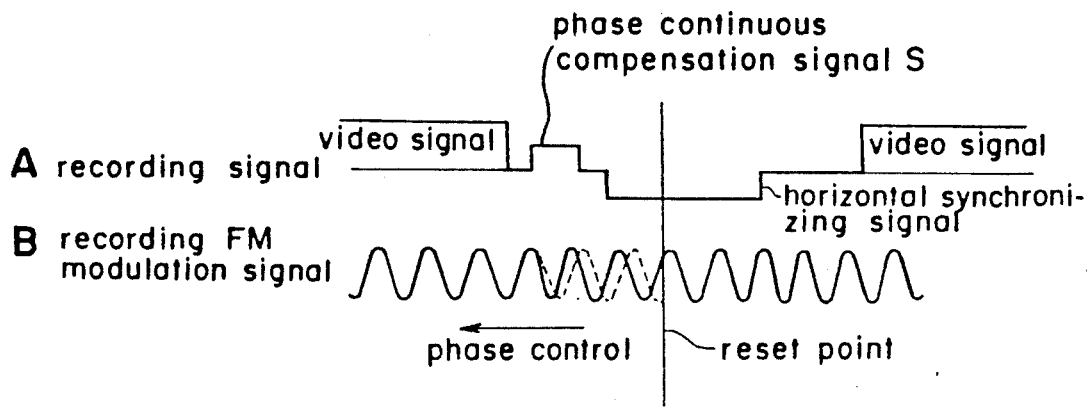
FIG. 4, consisting of A and B, is a waveform chart illustrating a phase continuous compensating signal.

The phase continuous compensating circuit 60 is provided within the recording circuit 10 so as to remove the discontinuity of the phase of the FM carrier generated at a phase reset point. To this end, the phase continuous compensating signal (s) is inserted into the video signal inputted to the recording circuit 10. As shown in FIG. 4, the phase continuous compensating signal (s) having a predetermined level is inserted into the front porch of the horizontal synchronizing signal in a predetermined period of time.

The frequency of the FM carrier is deviated by the phase continuous compensating signal (s). Therefore, the phases of the FM carrier at a phase reset point before and after the insertion of the phase continuous compensating signal (s) differs from each other.

The phase (shown by (B) in FIG. 4) at a phase reset point of the FM carrier before the insertion of the phase continuous compensating signal (s) varies depending on the level of a video signal inputted immediately before the insertion of the phase continuous compensating signal (s). When the phase continuous compensating signal (s) is inserted into the front porch of the horizontal synchronizing signal in this state, the phase of the FM carrier at the phase reset point is changed by the phase continuous compensating signal (s) as well (shown by (B) in FIG. 4).

It is possible to assume how the phase of the FM carrier at the phase reset point is changed by the insertion of the phase continuous compensating signal (s).

Thus, the phase of the FM carrier at the phase reset point can be changed to 0°, 180° or in the vicinity thereof by setting the level of the phase continuous compensating signal (s) for each line depending on the level of a video signal inputted immediately before the insertion of the phase continuous compensating signal (s).

As a result, the phase of the FM carrier at the phase reset point becomes continuous by inserting the phase continuous compensation signal (s). Even if the phase of the FM carrier is discontinuous, the degree of the discontinuity of the phase of the FM carrier is slight.

The phase of the FM carrier is reset for each line for the following reason:

Normally, in a magnetic recording, a low carrier wave FM system is adopted and a carrier wave generating portion is integrally formed with the FM modulation portion, so that these portions cannot be distinguished from each other. Thus, the phase information of the FM carrier modulated by a video signal (g) is lost within the effective scanning period of an image because the FM of the video signal is modulated. Therefore, it is necessary to add the phase information to every horizontal period. To this end, the FM carrier is reset by the reset pulse (h) for every horizontal period.

Considering the above-described fact, the phase continuous compensating circuit 60 is constructed as follows:

The video signal clamped at the pedestal level is first supplied to a front porch expansion circuit 61 provided as necessary.

This is because there is a case in which the phase continuous compensating circuit 60 does not allow the front porch provided at the front stage of the horizontal synchronizing signal to have a length (approximately 2.2 μsec. in NTSC) long enough to insert the phase continuous compensating signal (s) into the front porch expansion circuit 61.

The expansion circuit 61 is used in this embodiment.

The front porch is expanded by the following two methods: A first is to remove a part of the latter portion of a luminance signal present, immediately before the front porch (refer to FIG. 5). The second is to displace a horizontal synchronizing signal by substituting for it with another horizontal synchronizing signal (refer to Fig. 6).

Figure 5:
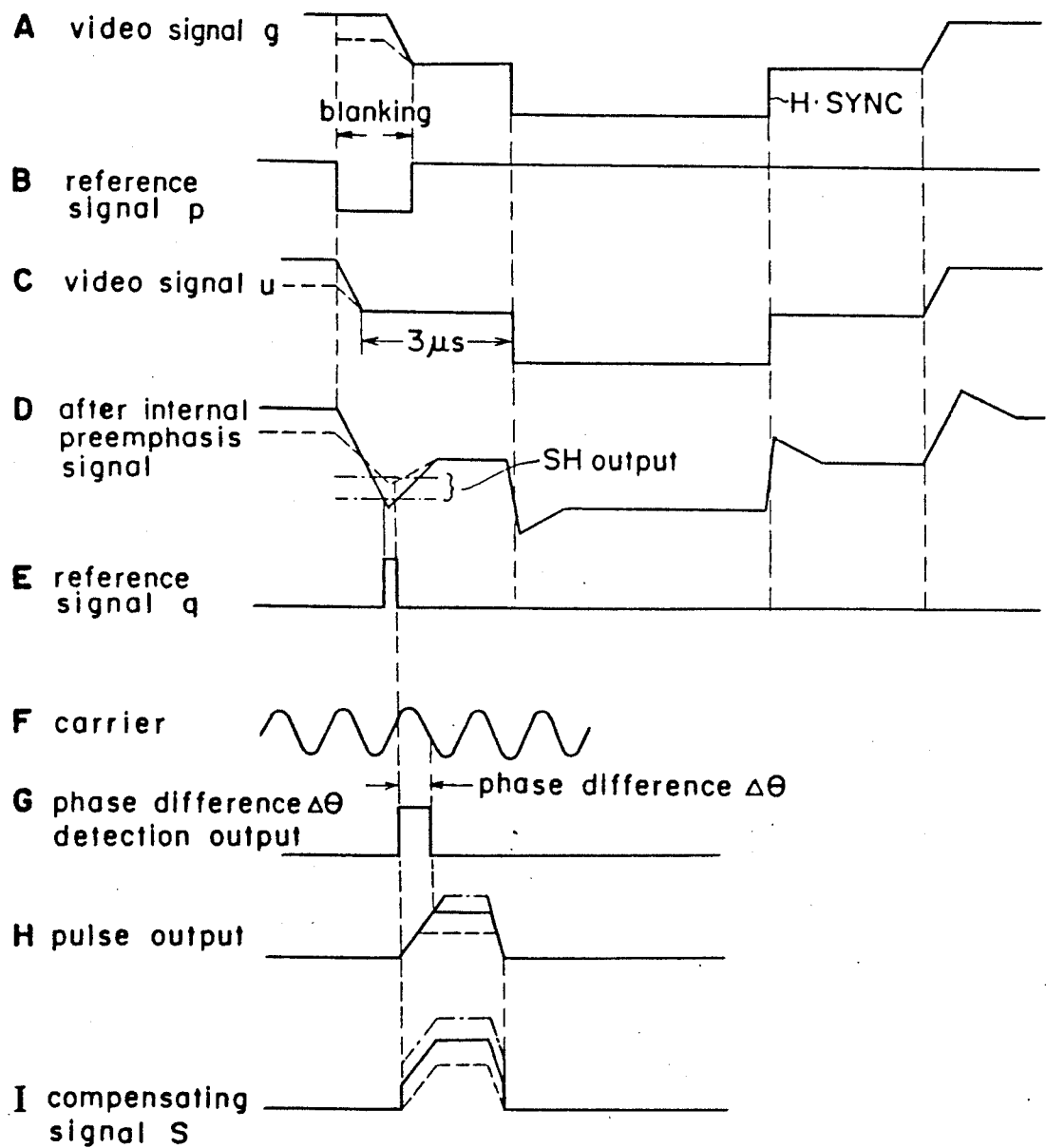

Referring to FIG. 5, a first reference signal (p) generated by a reference signal generating circuit 70 is supplied to the front porch expansion circuit 61. The reference signal (p) functions as a blanking pulse which blanks the latter portion of inputted video signals as shown by (A) and (B) in FIG. 5.

As a result, a video signal (shown by (C) in Fig. 5) whose front porch is wider than the standard width is outputted from the front porch expansion circuit 61.

Figure 6:
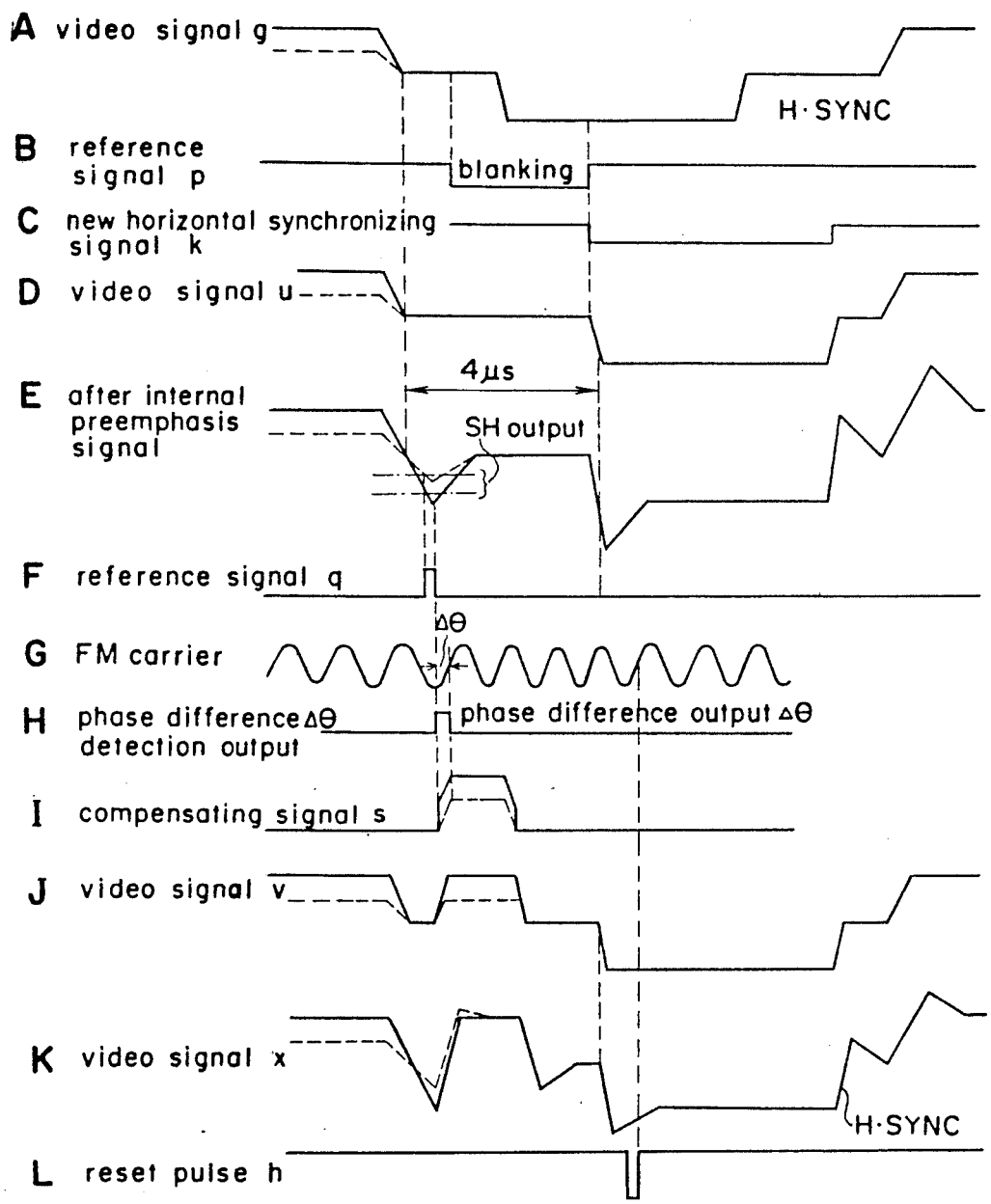

FIG. 6 shows the above-described latter case of expanding the front porch, namely, the case in which the horizontal synchronizing signal is displaced by substituting it with another horizontal synchronizing signal. The reference signal (p) also functions as a blanking pulse in this case. However, as shown by (A) and (B) in FIG. 6, the timing of the generation of the reference signal (p) is near the sync chip (fall timing) of the horizontal synchronizing signal and set to have a predetermined pulse including the falling edge.

Part of the horizontal synchronizing signal is removed by the reference signal (p), and a new horizontal synchronizing signal (shown by (C) in FIG. 6) is substituted for the horizontal synchronizing signal which has been partly removed. As a result, similarly to FIG. 5, a video signal with a wide front porch is outputted from the front porch expansion circuit 61.

The output of the front porch expansion circuit 61 and the phase continuous compensating signal (s) are added to each other in an adder 62. The phase continuous compensating signal (s) is generated as follows:

First, the phase of the FM carrier at a specific point is detected. The specific point is referred to as a point corresponding to the undershoot portion of a video signal generated when the video signal is pre-emphasized.

As shown by (D) through (F) in FIG. 5 and (E) through (G) in FIG. 6, the second reference signal (q) is supplied to a carrier phase difference detecting circuit 65 in which a phase difference $\Delta\phi$ (phase from the specific point to the zero crossing point of the FM carrier) at a point where the second reference signal (q) has been obtained is detected.

The phase difference detecting output (shown by (G) in FIG. 5 and (H) in FIG. 6) is supplied to a compensation signal generating circuit 64 in which the level of the pulse output (s) in a trapezoidal waveform is modulated depending on a detected phase difference (shown by (H) in FIG. 5 and (I) in FIG. 6).

The frequency deviation amount of the output pulse (s) differs depending on the magnitude of its level, which differentiates the phase at a phase reset point.

An assumption output (DC level) is also supplied from a phase shift assumption circuit 63 to the compensation signal generating circuit 64.

An assumption output in accordance with the undershoot of the video signal at the specific point is generated in the phase shift assumption circuit 63 in this example.

Accordingly, the phase shift assumption circuit 63 comprises an emphasizing circuit (not shown) having the same frequency characteristic as that of the emphasizing circuit 56 and a sampling hold circuit (not shown) which holds the sampling output, at the undershoot portion, to which the emphasizing characteristic has been applied.

Since the output (SH) of the sampling hold circuit is proportional to the undershoot amount, the output (SH) is utilized as the output by which the amount of a phase shift is assumed. The assumption output is added to the phase difference detecting output and the resulting output is superposed onto a video signal inputted to the recording circuit 10 as the phase continuous compensating signal (s) (shown by (I) in FIG. 5 and (J) in FIG. 6).

Thus, the frequency of the FM carrier is deviated by a signal obtained, by adding the assumption output (DC level) which is proportional to the undershoot of the video signal to a pulse output having a level corresponding to the phase difference of the FM carrier, namely, by utilizing the phase continuous compensating signal (s). The adjustment of the level of the phase continuous compensating signal (s) according to the content of the video signal allows the phase of the FM carrier at the phase reset point to be set to 0° or 180° and the phase of the FM carrier to be continuous when a phase reset is performed.

Even if the phase of the FM carrier cannot be made to be completely continuous, the phase difference at the phase reset point can be made to be slight.

The output (x) of the pre-emphasizing circuit 56 is shown by (K) in FIG. 6 and the reset pulse (h) is shown by (L) in FIG. 6. The reset pulse (h) is obtained a predetermined period of time after the peak-to-peak value of the leading edge of the horizontal synchronizing signal is obtained. The predetermined period of time is 1 $\mu$sec. in this example.

It seems that only a pulse output corresponding to the phase difference of the FM carrier at the specific point is enough to function as the phase continuous compensating signal (s), but the continuity of the phase of the FM carrier at the phase reset point cannot be sufficiently held by the pulse output only.

Figure 7:
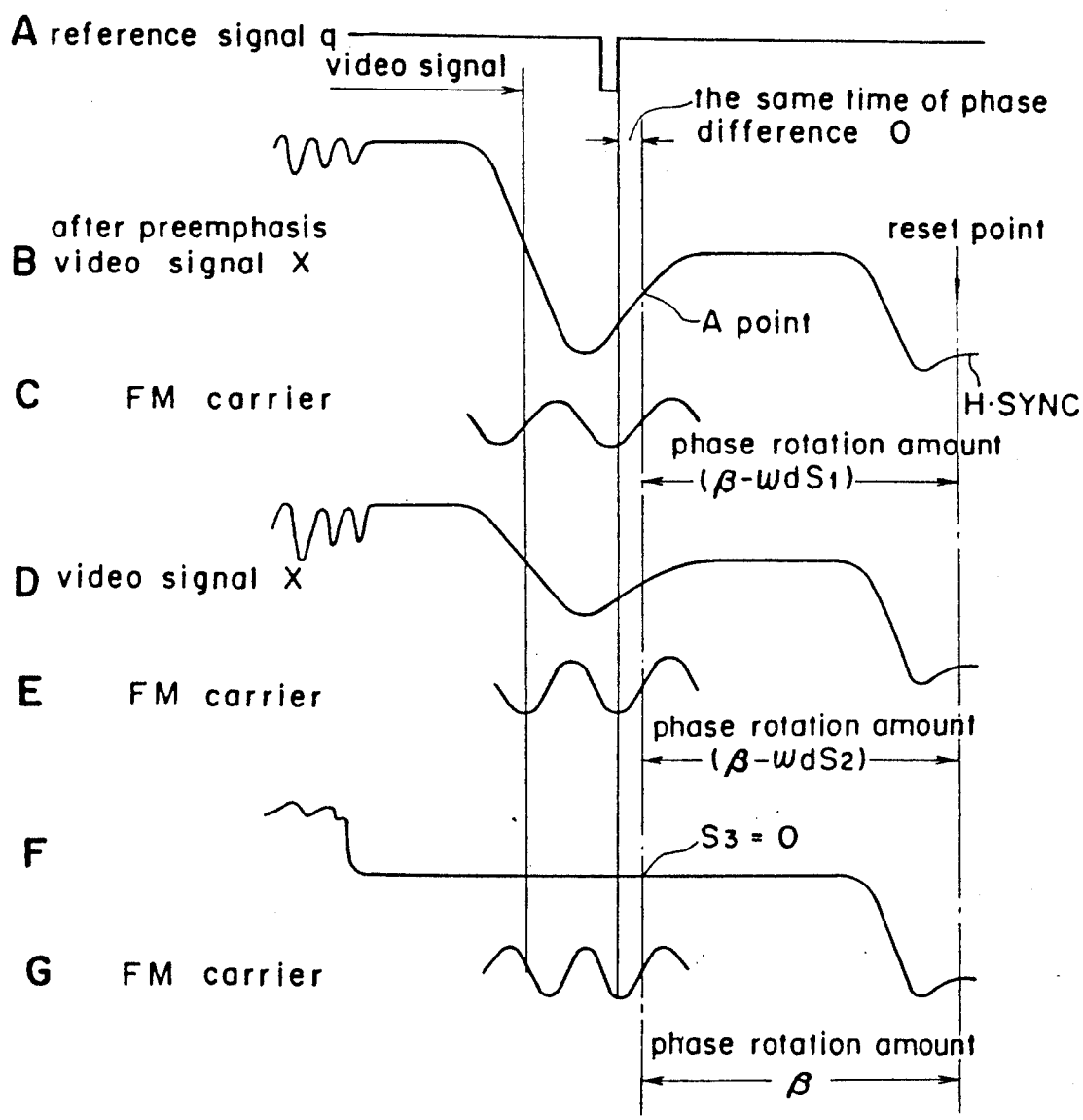

This is because as shown in FIG. 7, even when the detecting outputs of the phase difference $\Delta\theta$s at the specific point (point (A)) are the same, the phase shift amounts at the phase reset point in time are not constant.

That is, the phase differences of the inputted video signals shown by (B), (D), and (F) in FIG. 7 at the point (A) are constant ((C), (E), and (G) in FIG. 7). However, even when the phase differences at the point (A) are the same, the phase shift amounts fluctuate to a great extent according to the undershoot amounts at the point (A).

Thus, unless the undershoot amounts at the specific point are considered, the frequency deviation amounts are all the same in either case: The continuity of the phase at the phase reset point cannot be ensured.

Contrary to the above, frequency deviation amounts can be varied with the undershoot amounts by considering the undershoot amounts at the specific point. Thus, the phase of the FM carrier can be controlled so that it is continuous at the phase reset point by setting the levels of the sampling hold output (SH) and the level of the pulse output at desired levels.

Figure 2:
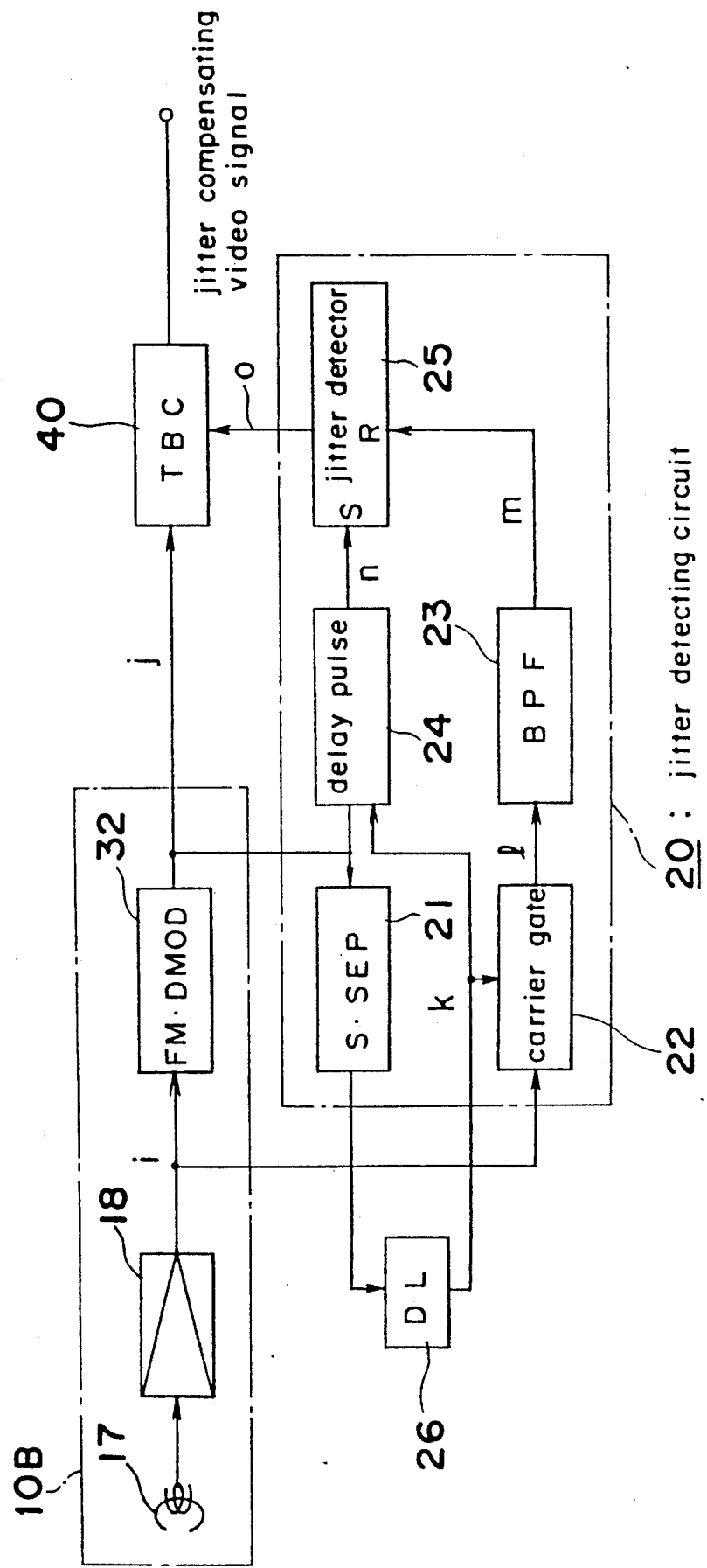
FIG. 2 is a schematic flow diagram of an example of a reproducing circuit with a jitter detecting apparatus for detecting jitter of a video signal in accordance with the present invention.

FIG. 2 shows an example of a video signal reproducing circuit 10B.

Figure 8:
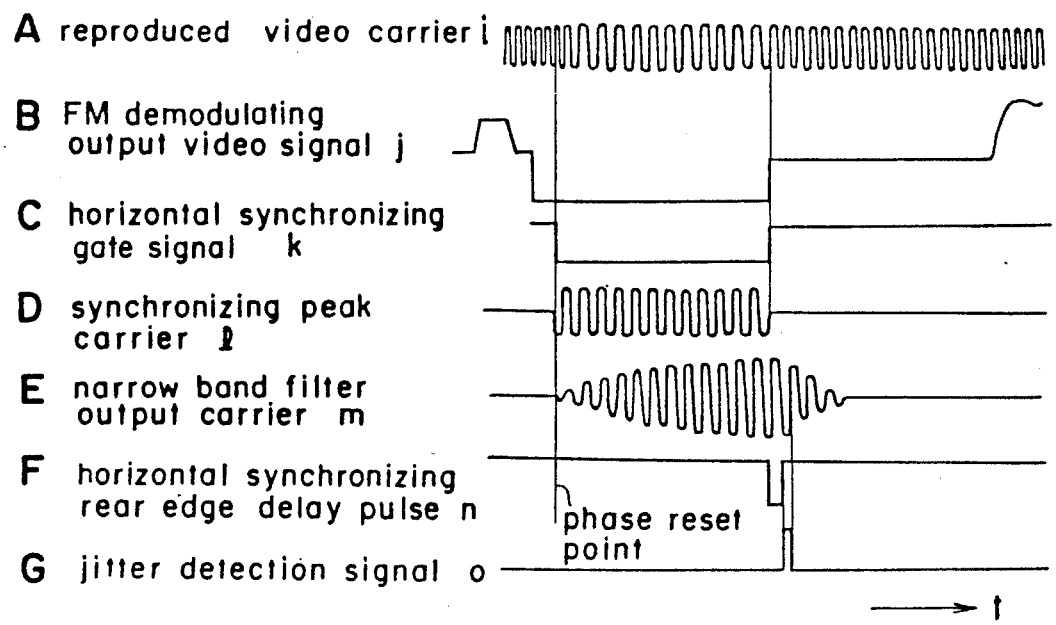
FIGS. 5, 6, 7 and 8 are waveform charts for describing the operation performed when the phase continuous compensating signal is inserted.

An FM video signal (i) (shown by (A) in FIG. 8) reproduced by a rotary magnetic head 17 is supplied to an FM modulator 32 through a pre-amplifier 18 and to a carrier gate circuit 22 of a jitter detecting circuit 20.

A video signal (j) (refer to (B) in FIG. 8) demodulated by an FM demodulator 32 is supplied to a time base correcting circuit 40 as an input video signal having a jitter component and also supplied to a synchronizing separating circuit 21 by which a horizontal synchronizing signal is extracted and separated from the video signal (j). Thereafter, the horizontal synchronizing signal (j) is supplied to a delay circuit 26 and carrier gate 22.

The delay circuit 26 functions to obtain the phase reset point (shown by (L) in FIG. 6) of the FM carrier. A horizontal synchronizing signal (k) delayed a predetermined period of time (1 $\mu$sec) is shown by (C) in FIG. 6.

The horizontal synchronizing signal (k) delayed by the predetermined period of time is supplied to a carrier gate 22 as a gate signal by which the FM carrier (carrier corresponding to the horizontal synchronizing peak-to-peak value) present between horizontal synchronizing signals is gated (shown by (D) in FIG. 6). The gated FM carrier (1) is used as a burst signal in a similar manner as in the conventional method.

The FM carrier (1) is supplied to narrow-band pass filter 23 in which the S/N thereof is improved. When 3.4 MHz is selected as the frequency of the FM carrier of the horizontal synchronizing peak-to-peak value, a filter of 3.4 MHz±0.1 MHz is used as a passband.

Using such a narrow-band filter, the level (effective value) of noise which has mixed with the FM carrier is reduced below ¼. As a result, the value of synchronizing jitter (fluctuation of time base) which has mixed with the FM carrier is reduced below ¼.

For example, when the value of the synchronizing jitter is approximately 16 nsec. before it is processed with the filter, the value of the synchronizing jitter is reduced to approximately 4 nsec. by the use of such a narrow-band pass filter. The FM carrier (m) obtained after it is processed by the filter is shown by (E) in FIG. 6.

The horizontal synchronizing signal (k) is also supplied to the delay pulse generating circuit 24 in which a delay pulse (n) (shown by (F) in FIG. 6) with a predetermined period of time lagging behind the trailing edge of the horizontal synchronizing signal (k) is generated.

The delay pulse (n) and the FM carrier (m) processed with the filter are supplied to a jitter detecting signal generating circuit 25, which is composed of an RS flip-flop set by the delay pulse (n), and reset by the zero crossing point of the FM carrier (m) inputted after it is set.

Accordingly, as shown by (G) in FIG. 8, a jitter detecting signal (o) is outputted from the jitter detecting generating circuit 25 as a signal synchronized with a specific zero crossing point of the cycle of the FM carrier (m).

The specific zero crossing point is referred to as the zero crossing point of a cycle at which the amplitude of the FM carrier (m) becomes maximum. In the waveforms shown in FIG. 8, since the amplitude becomes maximum in a cycle which lags approximately 1 μs behind the trailing edge of the horizontal synchronizing signal (k), the delay period of the delay pulse (n) is set to approximately 1 μs.

This is because the influence of noise superposed on the video signal is reduced by detecting a zero crossing point in a cycle whose S/N is high, so that jitter can be detected with a high accuracy.

The reason the delay pulse (n) is generated based on the trailing edge of the horizontal synchronizing signal is that the influence of a carrier leak at the time of frequency demodulation on the horizontal synchronizing signal is much less at the trailing edge thereof than at the leading edge thereof. That is, even if there is a carrier leak, the fluctuation of the phase of the leak component is reduced and stabilized from the leading edge (reset point of phase) of the horizontal synchronizing signal toward the trailing edge thereof. Therefore, the accuracy of the delay pulse (n) is improved.

When the frequency of the FM carrier (m) is 3.4 MHz, zero crossing points exist approximately every 1.47 nsec. Therefore, when the value of the synchronizing jitter of the horizontal synchronizing signal (k) at the trailing edge thereof is 100 nsec. at its maximum, it is possible to detect a specific zero crossing point at an accuracy below 5 nsec. if the S/N ratio is approximately 40 dB.

That is, the value of the residual jitter of a reproduced video signal can be suppressed below 5 nsec.

The cycle of the jitter generated at the trailing edge of the carrier reset demodulated horizontal synchronizing signal cannot be more than ½ cycle of the FM carrier. Therefore, a malfunction that the delay pulse (n) detects zero crossing points other than a predetermined specific zero crossing point does not occur.

The object of the present invention can be achieved by synchronizing the phase of the FM carrier with that of the horizontal synchronizing signal and superposing the phase continuous compensating signal (s) on a video signal. The above-described phase control necessary for holding the continuity of the phase of the FM carrier at the phase reset point thereof is qualitatively described.

Normally, a frequency modulation wave f(t) is expressed as follows:

$$f(t) = A\cos(\int(\omega_c + \omega_a v(t))dt + \phi)$$
$$= A\cos(\omega_c t + \phi + \omega_a \int v(t)dt)$$

where A is amplitude $\omega_c$, frequency deviation; $\omega_a$, carrier angular frequency; $\phi$, initial phase; v(t), modulation signal.

The above equation relates to a modulation system in which the fluctuation amount of a momentary angular frequency is proportional to the momentary value of a modulation signal.

The phase angle is expressed by the momentary phase angle $\phi(t)$ as follows:

$$\phi(t) = \omega_c + \phi + \omega_a \int v(t)dt$$

where $\phi$ is constant.

The above equation indicates that the phase angle can be controlled by using an integration value on the time base of a modulation signal.

The carrier phase can be controlled so that the phase is continuous before and after a reset point by adding a signal (rectangular or trapezoidal wave) having an appropriate area (integration value) to the front porch of a modulation signal (input video signal).

In this case, it is necessary to consider the influence of the pre-emphasizing circuit 56. This is because when a certain waveform is inserted into a pre-emphasized input video signal without considering de-emphasis, a horizontal synchronizing signal is distorted by the influence of the de-emphasis of the inserted waveform at the time of reproduction.

Figure 9:
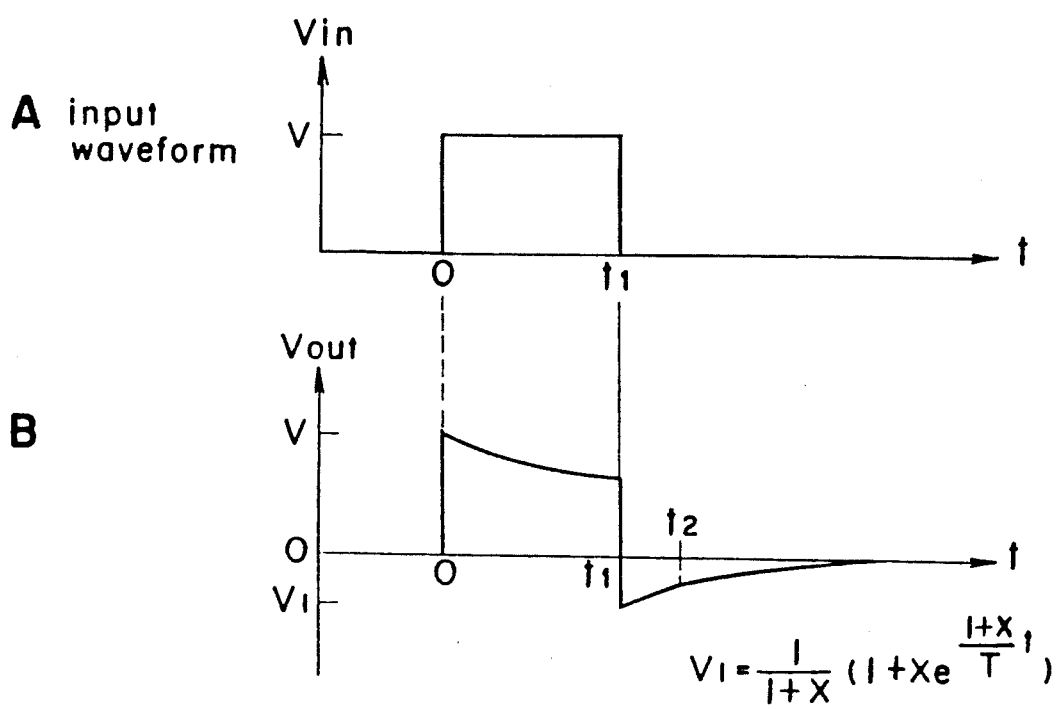
FIG. 9, consisting of A and B, illustrates waveforms for describing a pre-emphasizing processing.

The phase continuous compensating signal (s) is shown by (A) in FIG. 9 and the pre-emphasized waveform is shown by (B) in FIG. 9.

Figure 10:
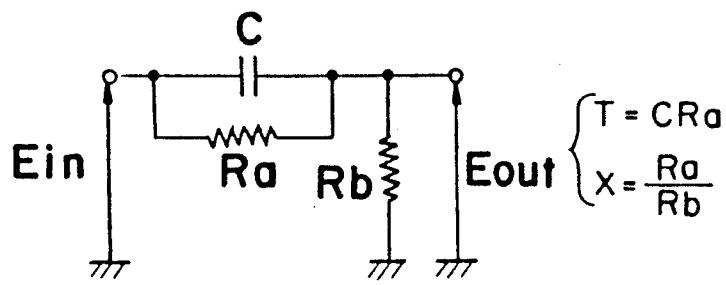
FIG. 10 is a connection diagram of an emphasizing circuit.
Figure 11:
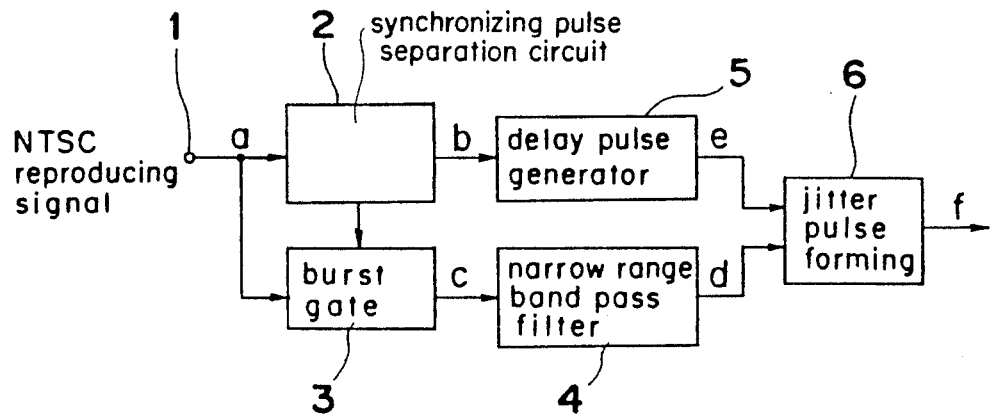
FIG. 11 is a schematic flow diagram of a jitter detecting circuit.

When a high-pass filter having the construction shown in FIG. 10 is used as the pre-emphasizing circuit 56, the transmission function G(s) and the modulation signal v(t) determined by G(s) are expressed as follows:

$$G(s) = \{(Rb + sCRaRb)/(Ra + Rb + sCRaRb))\}(s + 1/T)/(s + (1+X)/T)$$

$$v(t) = \int^{-1}(G(s)/s) = [u(t) + X \cdot \exp\{-(1+X)t/T\}]/(1+X)$$

When the edge of the waveform of the phase continuous compensating signal (s) to be inserted is regarded as a step steeper than the time constant of the pre-emphasis, the integrated value S(t) (output of the emphasizing circuit provided in the assumption circuit 63) between the point $t_1 \sim t_2$, when a rectangular wave whose voltage is V is inputted between the point $t_0 \sim t_1$ shown in FIG. 9, is as follows:

$$S(t) = S1(t) + S2(t)$$

where S1(t) indicates the integrated value obtained by inputting a step waveform (step waveform from 0 to 1) which rises when t=0.

Similarly, S2(t) indicates the integrated value obtained by inputting a step waveform (step waveform from 0 to 1) which falls when t=1.

The above equation can be changed as follows:

$$S(t_2) = \{S1(t_2) + S2(t_2)\}V$$
$$= V[\{t_1(1+X)\} - TX/(1+x)^2 - exp\{-(1+x)t_2/T\} - exp\{-(1+x)(t_2-t_1)/T\}]$$

From the above equation, $t_1$ and $t_2$ by which the value of the second term can be ignored are set. In this example, the relationship between $t_1$ and $t_2$ is expressed as follows when X=4, T=1.3 μsec.(home video of VHS system), and V=1.

$$S = t_1/5 - (T/5)(4/5)\{exp(-5t_2/T) - exp(-5(t_2-t_1)/T)\}$$

The value of the second term of the above equation can be less than 1% (value which can be ignored in consideration of the accuracy in clamping) of the value of the first term by selecting the following condition: when X=4, t<1, $t_2$=2T (>2.3 μsec.). The detailed description is omitted herein.

Thus, a relatively accurate control (error is below 1%) can be obtained in a short period of t=2T even if the phase continuous compensating signal (s) is inserted into the front stage of the pre-emphasizing circuit 56.

The time width T of the phase continuity compensating signal (s) controlling the phase of the FM carrier is determined by an integrated value (area) whose top side is 100% white level and which is necessary when a maximum phase difference is obtained. In this example, T=1.0 μsec.

When a VTR whose transmission band is wide such as a S-VHS is used, it is possible to determine a phase shift amount at the front porch by performing an operation after an A/D conversion of a video signal into digital data before recording is performed and also possible to adopt means for inserting the phase continuous compensating signal (s) in a trapezoidal waveform based on the digital data. According to these methods, the expansion circuit 61 can be omitted from the phase continuous compensating circuit 60.

The above description is directed to the application of the jitter detecting apparatus and the method therefor for the present invention to a VTR which records and reproduces a video signal using the MTCI system. However, a jitter detecting method in accordance with the present invention may be applied to a narrow-band input video signal obtained by narrowing a carrier wave recording band and converting a chrominance signal at a low frequency and recording the frequency modulation of an input video signal.

In addition to the above, the jitter detecting apparatus and the method thereof in accordance with the present invention can be applied to a video signal for use in a high density television (HDTV) and a MUSE signal for use in a satellite broadcasting. In this case, before a recording is performed, a positive polarity synchronization of the MUSE signal is substituted by a negative polarity synchronization and a synchronizing peak-to-peak value is reset as a reference burst, whereby several cycles reference burst recordings of MUSE signals are possible by the FM carrier even if the horizontal flyback time thereof is very short. Thus, jitter can be detected with high accuracy.

As described above, in the first embodiment of the present invention, a video signal is recorded by synchronizing the phase of the leading edge of a horizontal synchronizing signal with the phase of an FM carrier corresponding to a phase synchronizing peak-to-peak value for every horizontal period and the jitter of a reproduced video signal is detected by detecting a specific zero crossing point of a narrow-band FM carrier based on the trailing edge of a frequency-demodulated horizontal synchronizing signal at the time of reproduction.

Accordingly, the specific zero crossing point of the FM carrier can be detected with high accuracy. According to this method, the value of the residual jitter of the reproduced video signal can be reduced to 1/n of that conventionally detected.

This is because an FM carrier having a high S/N obtained by passing it through a narrow-band filter is used as in the conventional manner.

Since jitter of a signal reproduced by a VTR can be accurately detected, a phase error can be detected with high accuracy. Therefore, a speed error accuracy which is the difference value of the phase error is improved and a speed error correction can be easily made.

In addition, according to the present invention, a demodulation error, which is a disadvantage of a carrier reset system, can be reliably removed.

Therefore, according to the jitter detecting method in accordance with the present invention can be very preferably applied to a recording/reproducing system of a video signal employing the TCI system.

Second Embodiment

A second embodiment of the present invention is described with reference to FIGS. 18 through 21.

FIG. 18 is a block diagram showing an example of recording and reproducing a MUSE signal in accordance with the present invention. Referring to FIG. 18, a MUSE signal (a) having a short blanking period (MUSE HD period) of approximately 700 nsec. is inputted to a synchronizing substituting circuit 101 in which the horizontal blanking period is substituted by a negative polarity synchronizing signal (shown by (b) in FIG. 19). This signal is frequency-modulated by an FM modulation circuit 103 (an example of an FM allocation at this time is shown on the upper right in FIG. 19.)

Figure 19B:
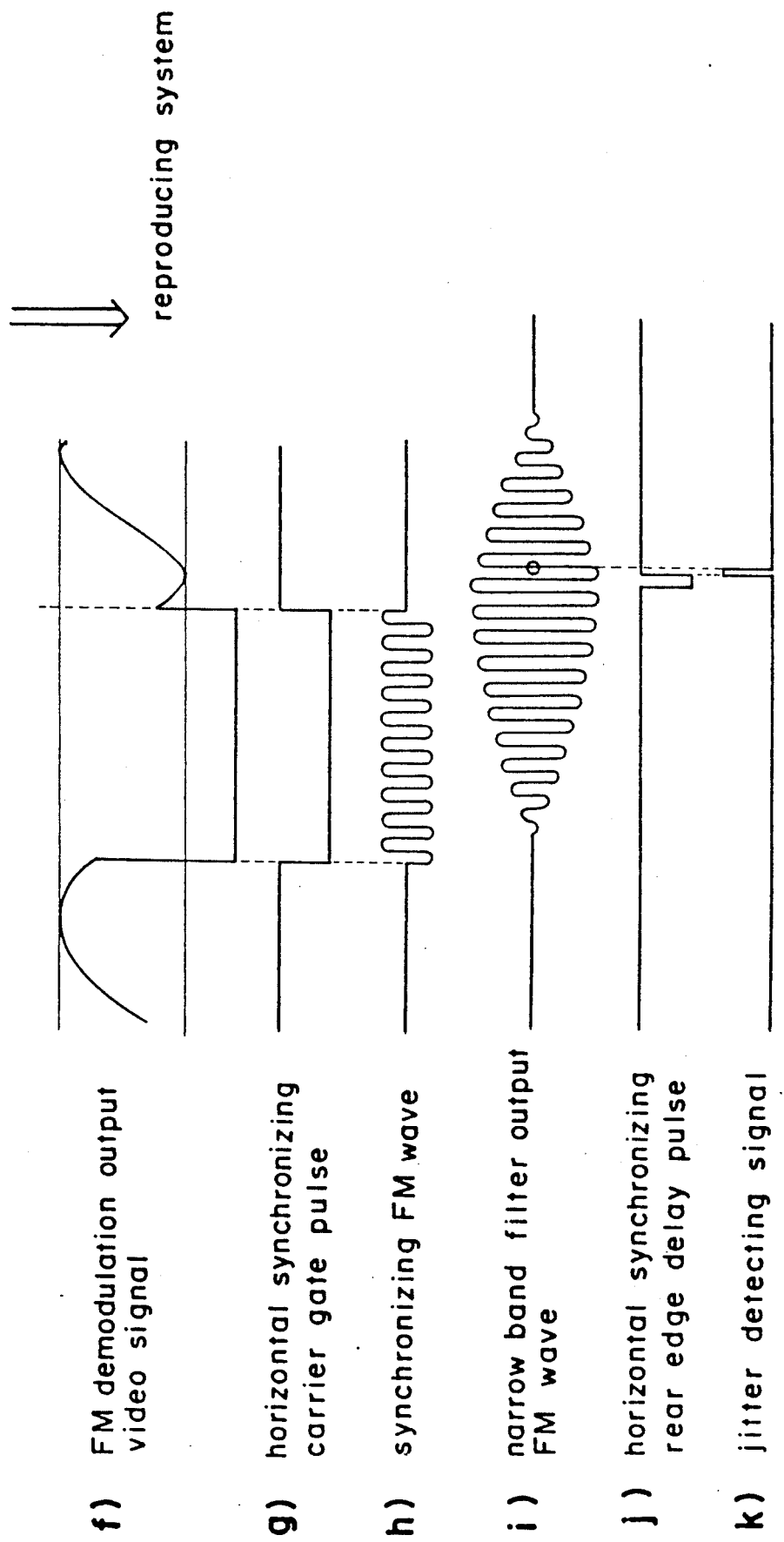

The FM modulation circuit 103 is of an external reset type in which the initial phase of a carrier (frequency is 8 MHz in this case, but a carrier may have a frequency higher than that of the video signal as shown by a dotted line (b) in FIG. 19, for example, 13 MHz) corresponding to a sync chip is reset by a reset pulse (c) to have a constant value for every horizontal period. That is, the synchronously substituted horizontal synchronizing signal is supplied to a reset pulse generating circuit 102 in which the reset pulse (c) synchronized with the leading edge of the horizontal synchronizing signal is generated.

An FM carrier phase corresponding to a synchronizing peak-to-peak value which corresponds to the leading edge of the horizontal synchronizing signal is reset by the reset pulse (c), whereby the phase of the rise portion of the horizontal synchronizing signal is synchronized with the phase of the FM carrier.

The number of the cycles of the FM carrier corresponding to the horizontal synchronizing signal portion depends on an FM frequency. An FM carrier (d) of approximately nine cycles can be obtained in a horizontal blanking period of the MUSE signal as short as approximately 700 nsec. and a detecting accuracy of within 5 nsec. is obtained when the S/N thereof is more than 30 dB at the time of a reproduction by setting the level of a synchronizing signal to be substituted to have the frequency modulation of 13 MHz.

The FM signal (d) thus obtained is recorded in a VTR by a magnetic head 104.

At the time of reproduction, an FM signal (e) reproduced by the magnetic head 104 is inputted to a frequency demodulation circuit 105 and a carrier gate circuit 107 constituting a jitter detecting circuit. A frequency-demodulated video signal (f) is supplied to a time base error correcting circuit 111 as an input video signal having a jitter component and also supplied to a synchronizing separating circuit 106 in which a horizontal synchronizing signal (g) is extracted and separated from the video signal.

The horizontal synchronizing signal (g) functions as the gate signal in the carrier gate circuit 107 and is capable of separating the FM carrier (FM carrier (h) corresponding to the horizontal synchronizing peak-to-peak value) present between horizontal synchronizing signals of the reproduced FM signal (e). The S/N of the separated FM carrier (h), namely, a reference burst can be improved by the narrow-band pass filter 110.

The frequency-demodulated video signal (f) is also supplied to a delay pulse generating circuit 108 in which a delay pulse (j) which lags a predetermined time period behind the trailing edge of the horizontal synchronizing signal is generated. The delay pulse (j) and the FM carrier (i) which is the output from the narrow-band pass filter 110 are inputted to a jitter detecting signal generating circuit 109 constituted by an RS flip-flop from which a jitter detecting signal (k) is outputted in accordance with a specific zero crossing point of the cycle of the delay pulse (j) and the FM wave (i). The specific zero crossing points are referred to as the point at which the amplitude of the FM carrier becomes maximum.

The reason the delay pulse (j) is generated based on the trailing edge of the horizontal signal is that the influence on the horizontal synchronizing signal by carrier leak at the time of a frequency demodulation is much less at the trailing edge thereof than at the leading edge thereof. That is, even if there is a carrier leak, the amount of the fluctuation of the phase of the leak component becomes less and the phase of the leak component becomes stabilized from the leading edge which is the reset point of the phase toward the trailing edge. Thus, the accuracy in detecting the timing of the delay pulse can be improved.

The jitter detecting signal (k) obtained by the above-described method and the frequency-demodulated video signal (f) are supplied to the time base error correcting circuit 111 from which a jitter component-corrected video signal is outputted.

Figure 20:
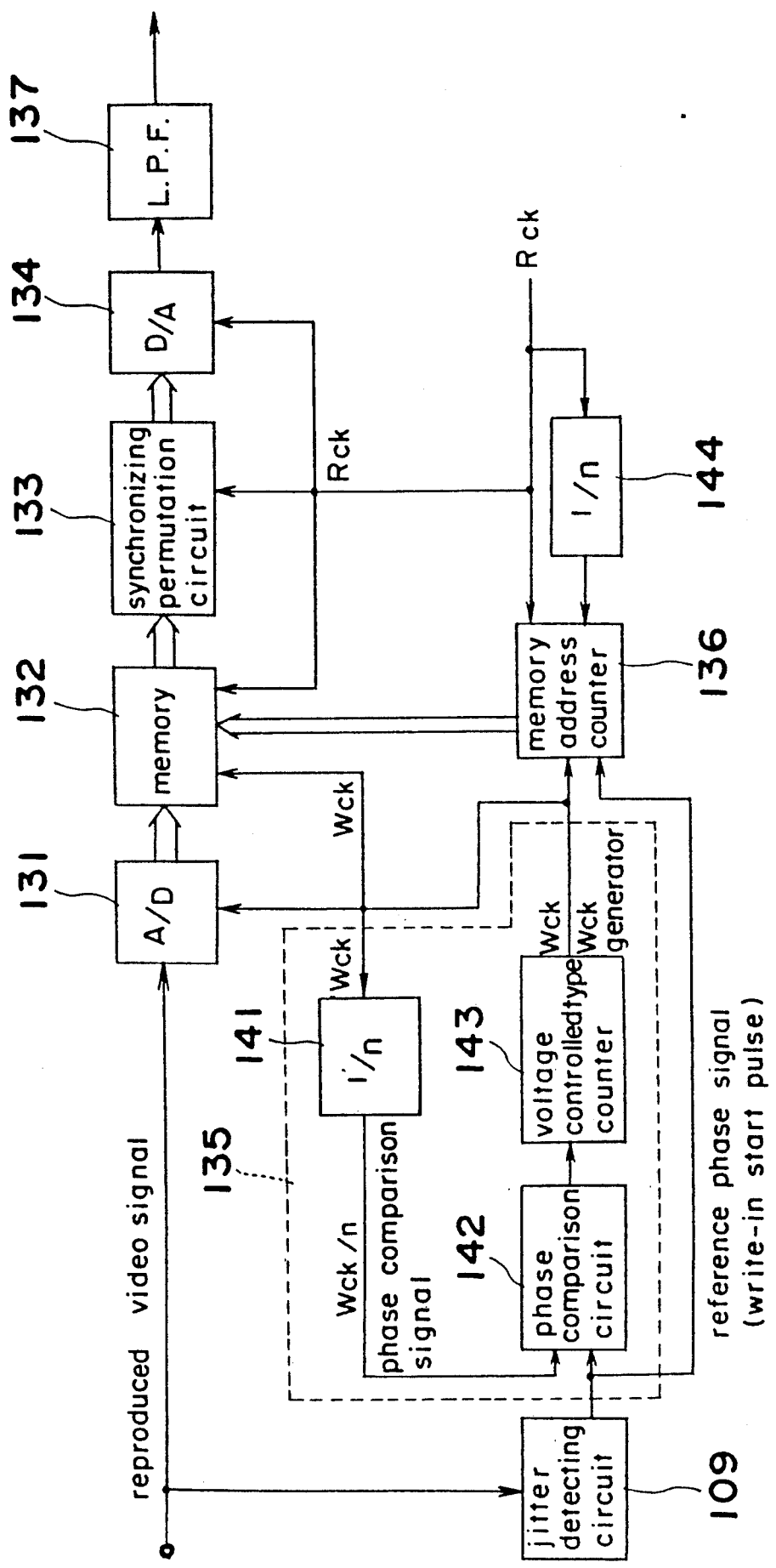
FIG. 20 is a block diagram illustrating an example of a time base error correcting circuit.

FIG. 20 shows a time base error correcting circuit.

Referring to FIG. 20, the jitter detecting signal (k) is obtained by the jitter detecting circuit 109 for every one horizontal scanning period (1H) of the reproduced video signal (f). The phase of the jitter detecting signal (k) is compared with that of a phase reference signal (Wck/n) obtained by dividing a write clock (Wck) which has been phase-locked by the reference phase into 1/n for every one horizontal scanning period (1H) in a phase lock loop 135. The reproduced video signal (f) is sampled by the write clock (Wck) through an A/D conversion circuit 131 and converted into a digital signal, and then, written in a memory 132.

Figure 21A:
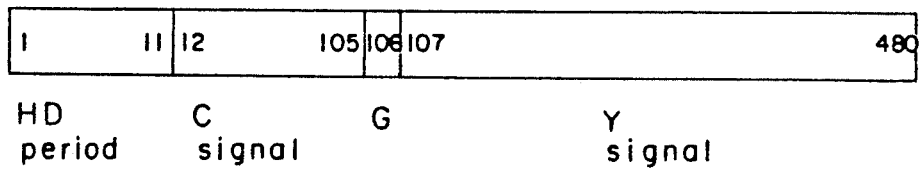
FIG. 21(a) illustrates an allocation of one horizontal line of a MUSE signal.
Figure 21B:
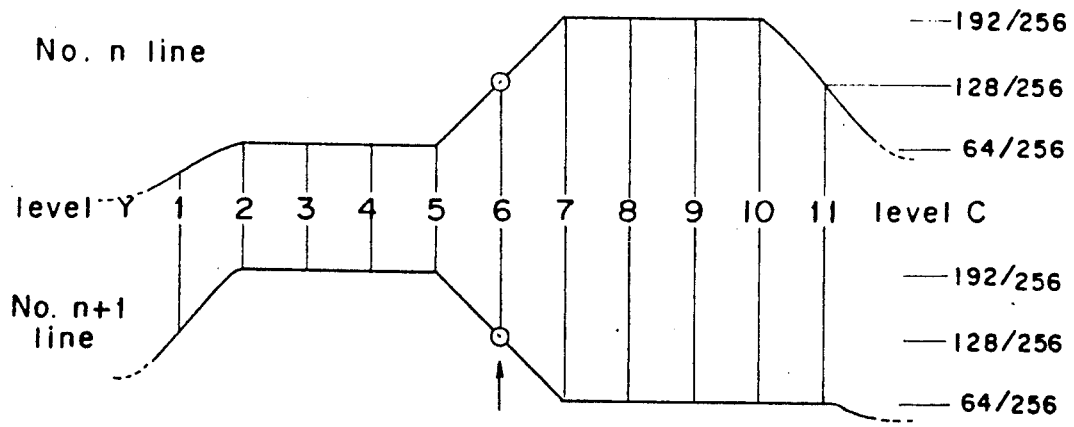
FIG. 21(b) is a view illustrating an HD waveform within the HD period of the MUSE signal.

The signal written in the memory 132 is read out by a stable clock (Rck), and a negative polarity synchronizing signal in the horizontal blanking period is substituted by a MUSE HD signal shown in FIG. 21(b) in a synchronizing substituting circuit 133.

As a result, an analog video signal outputted from a low-pass filter 137 through a D/A conversion circuit 134 becomes an original MUSE signal.

As described above, according to the second embodiment of the present invention, even when a video signal such as a MUSE signal which is very narrow in its horizontal blanking period and has a positive polarity synchronization is recorded and reproduced, a time base error can be detected with a high accuracy by using a video FM signal as a burst. Further, since the video FM signal becomes a high-pass frequency, the period of one cycle thereof becomes short. Thus, a reproduced video signal has few residual jitters because the time base error can be detected with a high accuracy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A jitter detecting method for detecting jitter generated in a video signal, the video signal generated by multiplying a luminance signal and chrominance signal in time bases thereof, comprising the steps of:

generating a synchronous signal;

synchronizing a phase of a leading edge of the synchronous signal with a phase of a constant frequency carrier corresponding to a sync tip portion of the video signal for every horizontal period during frequency modulation to generate a modulated video signal; and detecting a specific zero-crossing timing of a train of the constant frequency carrier corresponding to the sync tip portion, after passage of the constant frequency carrier through a band pass filter, base on a trailing edge of a frequency-demodulated synchronous signal during reproduction of the modulated video signal to thereby detect jitter.

2. The jitter detecting method of claim 1, further comprising the step of:

inserting a compensating signal into a front porch of the modulated video signal to prevent a discontinuity of the constant frequency carrier.

3. The jitter detecting method of claim 2, said step of inserting comprising:

removing part of a luminance signal present immediately before the front porch to generate an expanded front porch into which the compensating signal is therein inserted.

4. The jitter detecting method of claim 2, said step of inserting comprising:

removing part of the synchronous signal to generate an expanded front porch into which the compensating signal is therein inserted.

5. The jitter detecting method of claim 1, said step of detecting comprising:

frequency demodulating the reproduced modulated signal to generate the video signal;

separating the synchronous signal from the video signal and thereafter delaying the synchronous signal;

gating the reproduced modulated signal with the delayed synchronous signal to generate the constant frequency carrier corresponding to the sync tip portion;

generating a delay pulse, in accordance with the delayed synchronous signal, which lags a trailing edge of the synchronous signal by a predetermined time period; and generating a jitter detecting signal, based upon the specific zero-crossing timing of the train of the constant frequency carrier and the delay pulse.

6. A jitter detecting apparatus for detecting jitter generated in a video signal, the video signal recorded and reproduced by performing time division multiplexing or frequency division multiplexing of a luminance signal and a chrominance signal comprising:

synchronizing means for synchronizing a phase of a leading edge of a synchronous signal, or a phase in a vicinity thereof, with a phase of a constant frequency carrier corresponding to a sync tip portion of the video signal for every horizontal period during frequency modulation to generate a modulated video signal;

phase-continuous compensating signal means for preventing a discontinuity of a frequency-modulated carrier signal by inserting a compensating signal into a front porch of said synchronous signal when a phase thereof is synchronized to generate a compensated modulated video signal; and detecting means for detecting a specific zero-crossing timing of a train of the constant frequency carrier corresponding to said sync tip portion, after passage of the constant frequency carrier through a narrow band pass filter, based on a trailing edge of a frequency-demodulated synchronous signal during reproduction of the compensated modulated video signal to thereby detect jitter.

7. The jitter detecting apparatus of claim 6, said compensating signal changing a phase of a frequency-modulated carrier signal at a reset point to 0° or 180°, or in a vicinity thereof, to thereby prevent discontinuity.

8. The jitter detecting apparatus of claim 7, said phase-continuous compensating signal means removing part of a luminance signal present immediately before said front porch to generate an expanded front porch into which said compensated signal is inserted.

9. The jitter detecting apparatus of claim 7, said phase-continuous compensating signal means removing part of said synchronous signal to generate an expanded front porch into which said compensated signal is inserted.

10. The jitter detecting apparatus of claim 6, said synchronizing means comprising:

reset pulse generating means operatively coupled to the video signal, for generating a reset pulse synchronized with the leading edge of said synchronous signal; and frequency modulation means, coupled to said reset pulse generating means, for modulating the video signal, the constant frequency carrier being synchronized with respect to said reset pulse.

11. The jitter detecting apparatus of claim 10, said reset pulse generating means comprising:

automatic frequency control means, coupled to the video signal, for stabilizing said synchronous signal.

12. The jitter detecting apparatus of claim 6, said detecting means comprising:

frequency demodulation means for demodulating the reproduced compensated modulated video signal to generate the video signal;

synchronous separating means, coupled to said frequency demodulation means, for separating the synchronous signal therefrom;

delay means, coupled to said synchronous separating means, for delaying the separated synchronous signal;

carrier gate means, coupled to the reproduced compensated modulated video signal and gated by the delayed synchronous signal, for generating the constant frequency carrier corresponding to said sync tip portion;

delay pulse generating means, coupled to said delay means, for generating a delay pulse lagging a trailing edge of the synchronous signal by a predetermined time period; and jitter signal generating means, coupled to said delay pulse generating means and said narrow band pass filter, for generating a jitter detecting signal synchronized with the specific zero-crossing timing of the train of the constant frequency carrier.

13. The jitter detecting apparatus of claim 12, said jitter signal generating means comprising:

an RS flip-flop set by the delay pulse and reset by the specific zero-crossing timing after it is set.

14. A time base error detecting/correcting method comprising the steps of:

replacing part or all of a blanking period of a video signal which includes a synchronous signal, with a negative polarity synchronizing signal;

resetting a phase of a constant frequency carrier train, of a sync tip portion of the video signal, to a constant value at a leading edge of the replaced synchronous signal during frequency modulation;

recording the frequency modulated video signal in a recording medium;

reproducing and demodulating the frequency modulated video signal;

extracting the constant frequency carrier train from the reproduced video signal in accordance with the frequency-demodulated negative polarity synchronizing signal;

generating a horizontal synchronizing delay pulse signal which lags behind a trailing edge of the frequency-demodulated negative polarity synchronizing signal; and detecting a time error signal by comparing the extracted constant frequency carrier train with the horizontal synchronizing delay pulse signal during reproduction to generate a correction signal for correcting a time base error in the video signal.

* * * * *

UNITED STATES PATENT AND TRADEMARK OFFICE
CERTIFICATE OF CORRECTION

PATENT NO. : 5,045,950
DATED : September 3, 1991
INVENTOR(S) : Iwamura et al.

It is certified that error appears in the above-identified patent and that said Letters Patent is hereby corrected as shown below:

Title page, item [75], change "Fuchi" to --Fuchu--.

Signed and Sealed this

First Day of June, 1993

Attest:

MICHAEL K. KIRK

*Attesting Officer*     Acting Commissioner of Patents and Trademarks